US012040152B2

(12) United States Patent
Kaminer et al.

(10) Patent No.: US 12,040,152 B2
(45) Date of Patent: Jul. 16, 2024

(54) X-RAY RADIATION SOURCE SYSTEM AND METHOD FOR DESIGN OF THE SAME

(71) Applicant: Technion Research And Development Foundation Ltd., Haifa (IL)

(72) Inventors: Ido Kaminer, Haifa (IL); Michael Shentcis, Haifa (IL); Raphael Dahan, Moshav Gan Hashomron (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 17/641,987

(22) PCT Filed: Sep. 10, 2020

(86) PCT No.: PCT/IL2020/050997
§ 371 (c)(1),
(2) Date: Mar. 10, 2022

(87) PCT Pub. No.: WO2021/048856
PCT Pub. Date: Mar. 18, 2021

(65) Prior Publication Data

US 2023/0369004 A1 Nov. 16, 2023

Related U.S. Application Data

(60) Provisional application No. 62/899,249, filed on Sep. 12, 2019.

(51) Int. Cl.
*H01J 35/10* (2006.01)

(52) U.S. Cl.
CPC ......... *H01J 35/10* (2013.01); *H01J 2235/081* (2013.01); *H01J 2235/086* (2013.01); *H01J 2235/088* (2013.01)

(58) Field of Classification Search
None
See application file for complete search history.

(56) References Cited

U.S. PATENT DOCUMENTS 2,999,935 A * 9/1961 Foster .................... G01G 9/005 378/143
3,737,698 A * 6/1973 Carter .................... H01J 35/02 378/126

(Continued)

FOREIGN PATENT DOCUMENTS

JP 3419906 B2 * 6/2003
WO 2012004253 A1 1/2012
WO 2016/126780 A1 8/2016

OTHER PUBLICATIONS

V. V. Kaplin, et al., "Intensive coherent X-rays from multilayer mirrors," 5th Korea-Russia International Symposium on Science and Technology. Proceedings. KORUS 2001 (Cat. No. 01EX478), Tomsk, Russia, 2001, pp. 294-297 vol. 1, doi: 10.1109/KO (Year: 2001).*

(Continued)

*Primary Examiner* — Thomas R Artman
(74) *Attorney, Agent, or Firm* — BROWDY AND NEIMARK, P.L.L.C.

(57) ABSTRACT

An energy converter unit and X-ray source system are presented. The energy converter unit comprises a multilayered crystal structure having a selected layers' arrangement comprising at least first and second of layers of at least first and second material compositions. The layers-arrangement is formed of a pattern of n1 layers of said first layer type and n2 layers of said second layer type generating a selected lattice periodicity of said layers. The lattice periodicity is selected such that said multilayered crystal structure responds to the charged particle beam of predetermined (Continued)

parameters by coherent emission of X-ray radiation having selected spectral content and emission direction.

34 Claims, 5 Drawing Sheets

(56) References Cited

U.S. PATENT DOCUMENTS

| | | | | |
|---|---|---|---|---|
| 6,463,123 | B1 | 10/2002 | Korenev | |
| 10,785,858 | B2 * | 9/2020 | Kaminer | H05H 3/00 |
| 2011/0249803 | A1 | 10/2011 | Drory | |
| 2016/0227639 | A1 * | 8/2016 | Kaminer | H05H 3/00 |
| 2018/0090293 | A1 | 3/2018 | Liang et al. | |
| 2019/0057832 | A1 | 2/2019 | Durst et al. | |
| 2023/0369004 | A1 * | 11/2023 | Kaminer | H01J 35/08 |

OTHER PUBLICATIONS

M.L. Ter-Mikayelyan, "Present situation of diffracted x-ray radiation and resonance (coherent) transition radiation induced by high energy charged particles . . . " arXiv:hep-ex/0003015v1 (Year: 2000).*

Kaplin V Vet al: "Parametric X-rays generated by electrons in multilayer mirrors mounted inside a betatron", Nuclear Instruments & Methods in Physics Research. Section B: Beam Interactions With Materials and Atoms, Elsevier BV, NL, vol. 267, No. 5, Mar. 1, 2009 (Mar. 1, 2009) , pp. 777-780.

Kaplan A E et al: "X-Ray Narrow-Line Transition Radiation Source Based on Low-Energy Electron Beams Traversing a Multilayer Nanostructure" , Physical Review E. Statistical Physics, Plasmas, Fluids, and Related Interdisciplinary Topics, American Institute of Physics, New York, NY, US, vol. 52, No. 6, Jan. 1, 1995.

Xing Zhou et al: "2D Layered Material-Based van der Waals Heterostructures for Optoelectronics", Advanced Functional Materials, Wiley—V C H Verlag GmbH & Co. KGAA, DE, vol. 28, No. 14, Jan. 29, 2018.

Feranchuk I. D. et al: "Grazing incidence 1,2,4,5, parametric X-ray radiation from the 7-9,14, relativistic electron beam moving in 15 parallel to the superlattice surface", European Physical Journal Applied Physics., vol. 38, No. 2, May 21, 2007 (May 21, 2007), pp. 135-140.

Nasonov et al., "X-rays from relativistic electrons crossing a multilayer nanostructure", Nuclear Instruments and Methods in Physics Research Section B: Beam Interactions with Materials and Atoms, vol. 227, Issues 1-2, Jan. 2005, pp. 41-54, 01.

* cited by examiner

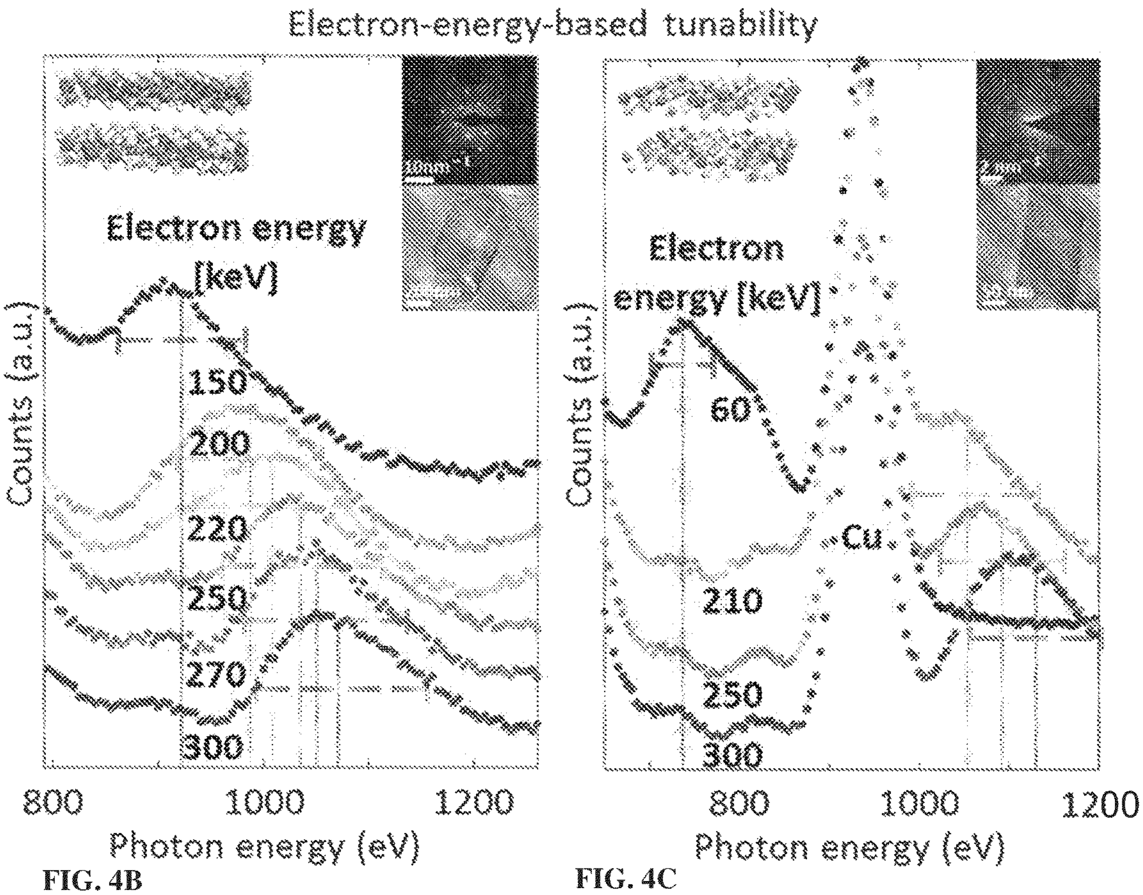
FIG. 4B
FIG. 4C
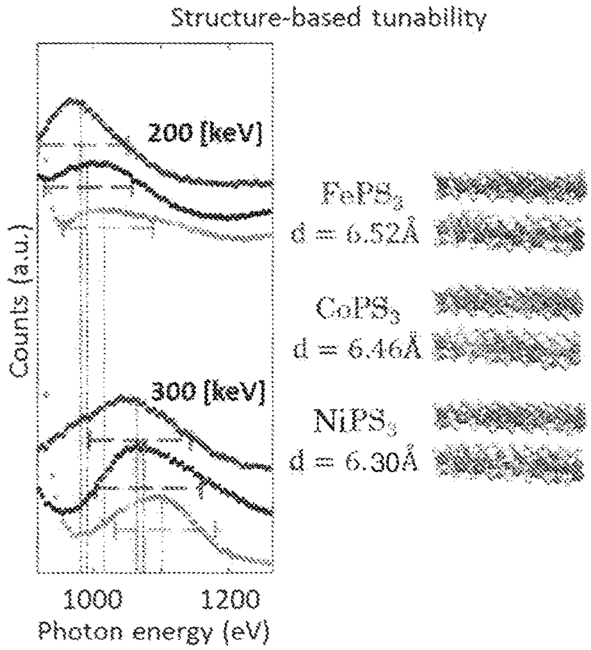
FIG. 5

X-RAY RADIATION SOURCE SYSTEM AND METHOD FOR DESIGN OF THE SAME

TECHNOLOGICAL FIELD

The present invention relates to radiation conversion and X-ray radiation sources. The technique specifically relates to design of compact and tunable X-Ray sources.

BACKGROUND

X-ray radiation is widely used in research, industrial and medical applications. Conventional state-of-the-art X-ray sources include synchrotron and free-electron laser (FEL) facilities, which accelerate particles to highly relativistic energies and undulate them to induce periodic acceleration that emits X-rays. Additional, relatively compact, X-ray sources utilize micron-scale periodicity of light for sources based on laser-driven particle acceleration. Some recent techniques suggest bypassing much of the acceleration by shrinking the undulating periodicity, confining electromagnetic fields in surface plasmons or meta-surfaces.

Van Der Waals (vdW) materials constructed of two-dimensional (2D) covalently bonded atomic layers bound along a third dimension by dispersion forces (Van Der Waals force). Graphite is one of the well-known vdW materials and is broadly used in industry in electrodes, lubricants, fibers, heat exchangers, and batteries. Graphene, an atom-thick layer of graphite, shows various material unique properties such as ultrahigh carrier mobility at room temperature, excellent optical transparency, high Young's modulus, high thermal conductivity, and many other properties of practical utility. Moreover, graphene is used in research applications enabling observation of novel phenomena such as the room temperature quantum Hall effect.

Transition metal dichalcogenides (TMDs) and transition metal thiophosphates (TMTs) are additional vdW material families having semiconducting electrical properties. TMDs can exhibit both indirect bandgap in the bulk or direct bandgap as a single-atomic layer. This unique property, combined with weak dielectric screening in two dimensions, gives rise to strong photoluminescence and large exciton binding energies, making TMDs attractive materials for light emitting devices. Likewise, TMTs are layered semiconductors having additional unique magnetic properties that make them potentially useful for application in quantum information devices and in spintronics.

GENERAL DESCRIPTION

There is a need in the art for a novel configuration of X-ray (and radiation conversion) emitting system. The present technique utilizes small periodicity structures where atomic crystal lattices undulate free electrons (or other charged particles) to generate energy tunable X-rays, enabling selection of the spectral-angular distribution of the emitted radiation. The present technique utilizes energy converter unit formed by at least one multilayer crystal structure having layer arrangement selected in accordance with desired spectral components of X-ray emission therefrom. This technique enables operation of X-ray radiation source with reduced requirements on the electron/charged particles' energy used for generating the X-ray radiation.

More specifically, the energy converter unit utilizes at least one multilayer crystal structure having selected periodic (or semi-periodic) arrangement of layers of two or more types or material compositions. Selection of periodicity of the multilayer structure, e.g. repeating pattern of the two or more layers, enable tailoring of X-ray emission spectra and direction in response to selected electron beam. Thus, the energy converter unit may be formed of a vdW crystal structure or heterostructure having layered arrangement of two or more type of layers, where layers form covalent bonds within the layer and generally vdW bonds between layers of the converter unit. The two or more types of layers may be different between them in material compositions and/or arrangement of the materials of the layers, generally the two or more types of layers provide corresponding two or more different interlayer distances as described in more detail further below.

As indicated above, vdW materials are formed of a collection of layers attached between them by Van der Waals attraction, i.e. generally non-covalent bonds. Such materials have various properties appealing for the use as energy converter for generating X-ray radiation. Typically, layered vdW materials have relatively high in-plane thermal conductivity and relatively high melting temperature, enabling the layered crystal to remove heat generated by interaction with the electron beam and allowing the crystal to withstand high power without thermal damage. Further, the use of arrangement of two or more types of layers having different material composition between them provides heterostructures that further reduce radiation damage that might be caused by electron beam impinging on the crystal or X-ray radiation emitted therefrom. The wide range of compositions and flexibility in the stacking of vdW materials in accordance with atomic lattice geometry of the layers. This provides tunability in shaping the output radiation by selection of the atomic lattice geometry as described herein below with respect to layers' periodicity and material composition.

The present technique is based on the inventors' understanding that free charged particles propagating trough a crystal lattice can undergo coherent interaction with the intrinsic atomic periodicity. This interaction may result in several radiation mechanisms including parametric X-ray radiation (PXR) and coherent bremsstrahlung (CB). Accordingly, a crystal structure having selected multilayer periodicity may undergo resonant interaction with electrons impinging thereon and emitting X-ray radiation by PXR and CB mechanisms with high efficiency. Generally, PXR and CB are treated herein as a combined effect referred to as parametric coherent bremsstrahlung—PCB. The weak van der Waals bonding between the layers maintains the crystalline nature of the energy converter supporting PXR and CB emission mechanisms. This is at least partly associated with size of crystal unit cell. Generally, vdW materials, formed by layers structure are characterized by crystals unit cells that are large as compared to size of unit cell in conventional three-dimensional bulk material. The larger unit cell enables relatively high brightness of X-ray emission generated from the crystal, and specifically at water window frequencies. For example, the present technique enables tunable radiation in wavelength range between 4.4 nm (282 eV) and 2.33 nm (533 eV), using electron beams that are typically available in transmission electron microscope or scanning electron microscope (TEM or SEM).

Generally, electro-magnetic field formed by electrons moving though the multilayered crystal structure (MCS) of the energy converter unit is diffracted of the periodic arrangement of the layers, resulting in emission of X-ray photons by PXR mechanism. The radiation emission of PXR may be described in similarity with Smith-Purcell theory, indicating a dispersion relation dependence on the electrons' energy, the electron propagation direction with respect to the crystal lattice vector as well as the direction of radiation emission, the periodic arrangement of the layers and the energy spectrum of the emitted radiation. The dispersion relation can generally be described in the following equation $$\hbar\omega_m = \frac{hc\beta\cos(\theta)}{(n_1 d_1 + n_2 d_2)(1 - \beta\cos(\varphi))} \cdot m.$$

where $\omega_m$ is the X-ray emission frequency, m is an integer (0, 1, 2, 3 . . . ); θ is the angular relation between wavevector of the electron beam and reciprocal lattice vector, and φ is the angular relation between wavevector of the electron beam and the emitted X-ray direction, $n_1$ and $n_2$ indicated the periodic structure of the MCS, $d_1$ and $d_2$ are respective interlayer distances, c is the speed of light and β is relativistic velocity of the electrons (v/c). Both PXR and CB mechanisms can be described geometrically as compliance with Bragg geometry, which results in production of directional, energy-angular dependent radiation.

The multilayer crystal structure according to some embodiments of the present technique, is formed of a selected arrangement of at least first and second layers having corresponded first and second (generally different) material compositions, in a selected periodicity (being constant or changing throughout the structure). For example, the selected arrangement is defined by a repeating pattern of selected number $n_1$ of layers of the first material composition and selected number $n_2$ of layers of the second material composition, thereby forming a repeating periodic pattern.

In this connection it should be noted that the present technique is based on utilizing interaction of charged particles with the multilayered crystal structure. Generally, in some embodiments the charged particles used are electrons. To this end the term electron as used herein should be understood broadly as referring to any charged particle that can be accelerated and directed onto the MCS described herein. More specifically, the charged particles may be electrons, protons, positrons, alpha particles, or any other charged particles that can be accelerated and directed onto the MCS.

Thus, according to a broad aspect, the present invention provides an energy converter unit comprising a MCS having a selected layers' arrangement comprising at least first and second of layers of at least first and second material compositions; said layers' arrangement is formed of a pattern of n1 layers of said first layer type and n2 layers of said second layer type generating a selected lattice periodicity of said layers; said lattice periodicity is selected such that said MCS responds to the charged particle beam of predetermined parameters by coherent emission of X-ray radiation having selected spectral content and emission direction.

According to some embodiments, the selected layers' arrangement, and selected lattice periodicity of said layers of said MCS may be selected in accordance with a desired angular distribution of spectral content of said coherent X-ray emission.

According to some embodiments, the MCS may be formed of a multilayered Van der Waals material heterostructure.

According to some embodiments, the selected lattice periodicity may be defined by selected numbers of layer $n_1$ and $n_2$ and interlayer first and second distance $d_1$ and $d_2$ of layers of the first and second material compositions respectively, to provide the coherent X-ray emission having spectral components and angular distribution according to $$\hbar\omega_m = \frac{hc\beta\cos(\theta)}{(n_1 d_1 + n_2 d_2)(1 - \beta\cos(\varphi))} \cdot m,$$

wherein $\omega_m$ is the X-ray emission frequency, m being an integer (0, 1, 2, 3 . . . ) marking the order of the effect; θ is the angular relation between the wavevector of the electron beam and the reciprocal lattice vector, and φ is the angular relation between the wavevector of the electron beam and the emitted X-ray direction. According to some embodiments, the multilayered crystal structure provides dominant X-ray emission order m given by $m=n_1+n_2$.

According to some embodiments, the MCS may be formed by layers' arrangement comprising first and second layers having first and second material compositions selected from: graphene, hexagonal Boron nitride (hBN), $WSe_2$, $CrPS_4$, $FePS_3$, $MnPS_3$, $NiPS_3$, $CoPS_3$, $MoS_2$, InAr, GaSb, Mo, Si, $WSe_2$, and Bulk tungsten (W).

According to some embodiments, the multilayered crystal structure may be formed with gradual variation of the number of layers $n_1$ or $n_2$ providing curved wavefront of X-ray emission from said energy converter unit.

According to some embodiments, the lattice periodicity may change between layers, in the form of variation of said number of layers $n_1$ and $n_2$ of the first and second material compositions.

According to some embodiments, the multilayer crystal structure may be bent about a selected axis, providing effective variation in distance between layers with respect to charges particles beam passing through the multilayer crystal structure.

According to one other broad aspect, the present invention provides an X-ray source unit comprising an energy converter unit adapted for emitting X-ray radiation in response to a charged particles beam directed thereto; said energy converter unit comprises one or more multilayered crystal structures having a selected layers' arrangement comprising at least first and second of layers of at least first and second material compositions; said layers' arrangement is formed of a pattern of $n_1$ layers of said first layer type and $n_2$ layers of said second layer type generating a selected lattice periodicity of said layers; said lattice periodicity is selected such that said MCS responds to the charged particle beam of predetermined parameters by coherent emission of X-ray radiation having selected spectral content and emission direction.

According to some embodiments, the selected layers' arrangement, and selected lattice periodicity of said layers of said MCS may be selected in accordance with a desired angular distribution of spectral content of said coherent X-ray emission.

According to some embodiments, the X-ray source system may further comprise a charged particle emitting unit configured for emitting the charged particle beam having selected energy impinging onto said MCS with a selected angle of incident.

According to some embodiments, the MCS may be formed of a multilayered Van der Waals material heterostructure.

According to some embodiments, the MCS may be formed by using Molecular Beam Epitaxy (MBE) and similar superlattice structure growth techniques utilizing various compositions of materials, including III-V materials (e.g., such as GaAs, InP, etc.); group III-Nitrides and III-V-Nitrides (such as Si, NaCl, GaP, InP, SiC, W, ZnO, $MgAl_2O_4$, $TiO_2$, MgO etc.).

According to some embodiments, the selected lattice periodicity may be defined by selected numbers of layer $n_1$ and $n_2$ and interlayer first and second distance $d_1$ and $d_2$ of layers of the first and second material compositions respectively, to provide the coherent X-ray emission having spectral components and angular distribution according to $$\hbar\omega_m = \frac{hc\beta\cos(\theta)}{(n_1 d_1 + n_2 d_2)(1 - \beta\cos(\varphi))} \cdot m,$$

wherein $\omega_m$ is the X-ray emission frequency, m being an integer (0, 1, 2, 3 . . . ); θ is the angular relation between wavevector of the electron beam and reciprocal lattice vector, and φ is the angular relation between wavevector of the electron beam and the emitted X-ray direction. According to some embodiments, the multilayered crystal structure provides dominant X-ray emission order m given by $m=n_1+n_2$.

According to some embodiments, the MCS may be formed by layers' arrangement comprising first and second layers having first and second material compositions selected from: graphene, hexagonal Boron nitride (hBN), $WSe_2$, $CrPS_4$, $FePS_3$, $MnPS_3$, $NiPS_3$, $CoPS_3$, $MoS_2$, InAr, GaSb, Mo, Si, $WSe_2$, and Bulk tungsten (W).

According to some embodiments, the X-ray source system may comprise an energy converter mount configured for mounting said multilayered crystal structure, and wherein said X-ray source system comprises a selected set of multilayered crystal structures having selected different layers' arrangement differing by at least said pattern of $n_1$ layers of said first layer type and $n_2$ layers of said second layer type, thereby enabling to selectively vary spectral content of X-ray emission.

According to some embodiments, the X-ray source system may further comprise a crystal switching mechanism configured and operable to selective position a selected multilayered crystal structure in path of an electron beam for generating selected spectral content of X-ray emission.

According to yet another broad aspect, the present invention provides a method for use in designing energy conversion unit, the method comprising: determining selected spectral components of emitted radiation, determining selected exciting electron beam energy, determining angular relation between electron beam and emission directions; using the data on spectral components of emitted radiation, electron beam energy and angular relations and determining layered arrangement formed of two or more material compositions; producing one or more MCS of the two or more material compositions.

According to some embodiments, producing said one or more multilayered crystal structure comprises using layer deposition of said two or more material compositions is in said arrangement of two or more layers.

According to some embodiments, said arrangement of two or more layers is formed by an arrangement of $n_1$ layers of a first material composition followed by $n_2$ layers of a second material composition.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 4A to 4C show measured and simulated emission spectra for selected electron beam energies, FIG. 4A shows emission spectra for $WSe_2$ based MCS, FIG. 4B shows emission spectra using $MnPS_3$, FIG. 4C shows emission spectra for $CrPS_4$;

FIG. 5 shows comparison of emission spectra between selected materials of the MCS;

DETAILED DESCRIPTION OF EMBODIMENTS

Figure 1:
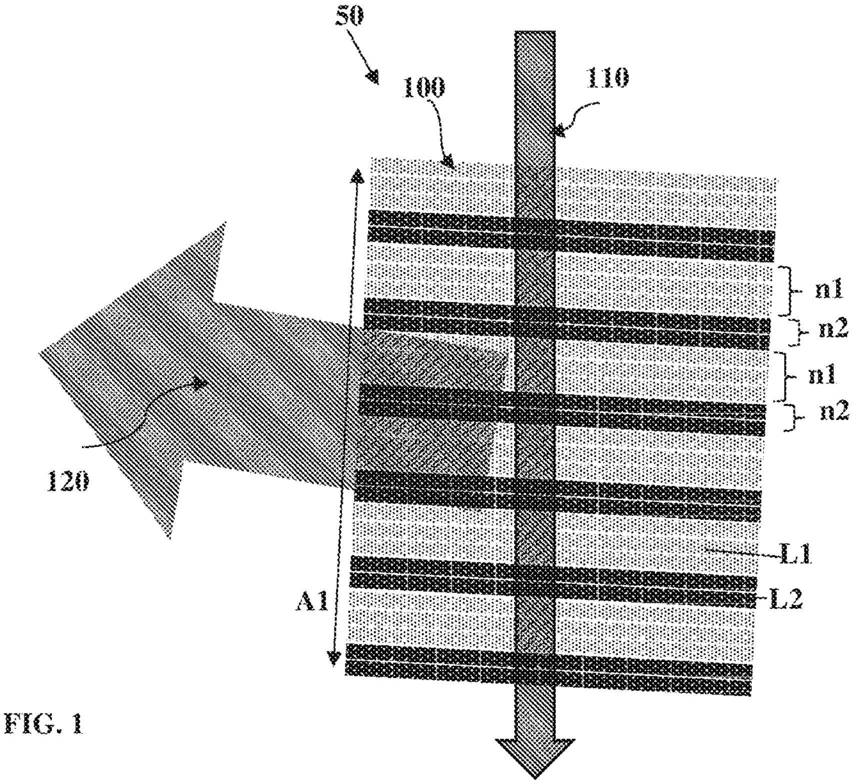
FIG. 1 exemplifies an energy converter unit according to some embodiments of the present invention.

As indicated above, the present technique utilizes selected periodic arrangement of a multilayered crystal structure (MCS) for energy conversion and generating X-ray radiation of selected spectra and direction. Reference is made to FIG. 1 exemplifying an energy converter unit 50 including at least one MCS 100. The energy converter unit 50 is configured for emitting X-ray radiation 120 of selected spectral content and direction, in response to an electron beam 110 impinging thereon.

According to the present technique, the MCS is formed by a selected layers' arrangement of at least first and second segments L1 and L2 having corresponded first and second material compositions and number of layers in the segments. More specifically, the arrangement is formed by a pattern of n1 layers of the first material composition, followed by n2 layers of the second material composition, generating a selected lattice periodicity of the MCS 100. Material compositions and lattice periodicity of the MCS are selected in accordance with desired X-ray emission and electron beam characteristics for operation of the energy converter unit 50 as described in more detail further below.

The energy converter 50 is configured for interacting with the electron beam 110 impinging thereon and responding by emission of X-ray radiation 120 having certain spectral content and propagating at certain spatial distribution. The spectral content, or at least central frequency/wavelength of the emitted spectrum, and the direction of propagation are determined by configuration of the MCS 100 and controlled parameters such as relative angle between the electron beam 110 wave vector and the emission 120 direction, and energy of the electron beam 110. More specifically, periodicity of the MCS 100 is selected in accordance with predetermined relation between periodicity and arrangement of the structure and properties of X-ray radiation 120 emission in accordance with properties of the electron beam 110. Such properties include central wavelength, wavelength distribution and direction of propagation of the emitted X-ray radiation 120. In addition to the construction and arrangement of the MCS 100, the X-ray emission is determined based on energy of the electron beam 110 used for exciting the MCS 100.

Figure 2:
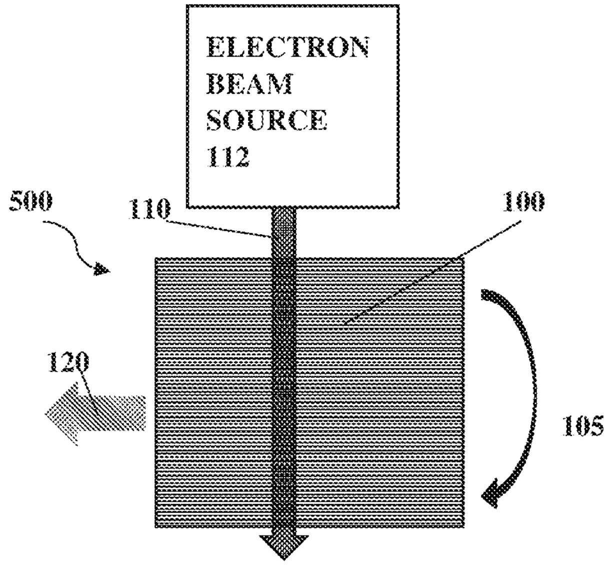
FIG. 2 exemplifies an X-ray radiation source system according to some embodiments of the present invention.

The energy converter unit 50 may be used in X-ray source system 500 as exemplified in FIG. 2. More specifically, such X-ray source system 500, may include one or more multilayered crystal structures 100 positioned in path of electron beam 110, e.g. emitted from electron beam source 112, e.g. electron gun. Angular orientation of the MCS 100 is selected in according with predetermined relation between angle θ, defined as the angle between propagation path of the electron beam 110 and lattice direction of the MCS (for example [1 0 0] axis—A1 in FIG. 1, perpendicular to each layer), and angle φ, defined as angle between direction of propagation of the electron beam 110 and main direction of propagation of the emitted X-ray radiation 120.

Accordingly, the MCS 100 may be mounted on rotating platform (exemplified by rotation arrow 105) configured for selectively determine angle θ of the MCS 100 with respect to the direction of propagation of the electron beam 110. Variation of the angle θ may be used for selecting spectral content (wavelength) of the emitted X-ray radiation for given electron beam properties as indicated in more detail below. Thus, the rotating platform 105 may be used for selectively adjusting relative angle θ of main axis of the MCS 100 with respect to direction of propagation of the electron beam 110, to tune one or more of spectrum and direction of emitted X-ray radiation 120. Generally, the rotating platform 105 may be formed as a crystal mount positioned on a rotating motor (e.g. stepper motor) enabling selective rotation of the MCS 100.

Additionally, in some embodiments, the X-ray source system 500 may include a selected number of multilayered crystal structures (MCSs) 100 mounted to be selectively exposed to exciting electron beam for generating X-ray radiation with selected wavelength. The MCSs 100 may generally be different between them in arrangement of layers and/or material compositions of the layers to provide emission of wider range of X-ray wavelengths. As described in more detail below, layers' arrangement of the MCS is associated with a relation between spectral components and direction of emitted X-ray radiation in response to electron beam of given energy and direction. In some examples, the two or more different multilayered crystal structures may be mounted on a moving or rotating platform configured for selectively positioning a selected one of the MCSs 100 in path of exciting electron beam to provide X-ray radiation emitting therefrom of selected properties in accordance with structure of the MCSs.

Further, in some embodiments, the X-ray source system 500 may be formed with a dedicated mount of the energy converter unit and a selected set of MCSs having selected different layers' arrangements. The system 500 includes a rotating mechanism (e.g. mechanical arm, rotating disc etc.) configured to selectively switch MCS positioned at the dedicated mount to provide X-ray emission with selected spectral content in accordance with layer arrangement of the selected MCS as described herein below.

Figure 3:
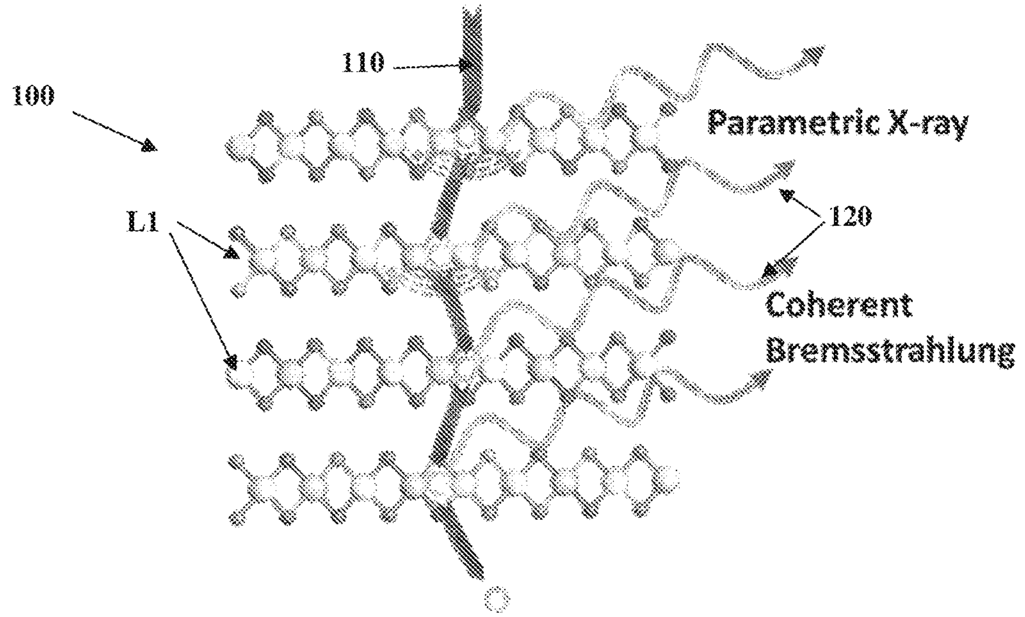
FIG. 3 exemplifies X-ray emission mechanism according to some embodiments of the present invention.

As indicated above, the design of the MCS 100 in some embodiments of the present technique, is based on the inventors' understanding that two mechanisms for X-ray emission may generally be viewed as combined mechanism. This is as the spectrum and relative direction of the emitted radiation are substantially similar. FIG. 3 exemplifies interaction of electron beam 110 with MCS 100 resulting in emission of X-ray radiation 120 by parametric X-ray emission (PXR) and coherent Bremsstrahlung (CB). Such interaction may generally be described by the following dispersion relation:

$$E = \hbar\omega = \frac{hc\beta\cos(\theta)}{d(1-\beta\cos(\varphi))}\cdot m \text{ where } m = 0, 1, 2, 3 \ldots \tag{1}$$

where $\omega_{CB,n}$ is the frequency of emitted radiation, $E=\hbar\omega$ is the photon energy; h is Plank constant, c is the speed of light, β is relativistic electron speed (speed of the electrons divided by speed of light), θ is the relative angle between direction of propagation of electron beam and directional axis of the layered crystal structure, φ is relative angle between direction of emission of X-ray radiation and direction of propagation of the electron beam, and d is inter-layer distance of the structure.

The present technique further utilizes a MCS formed of a layers' arrangement having layers of at least first and second material compositions (referred to as first and second layers). This configuration allows further tailoring of the emitted X-ray radiation in accordance with theoretical description of the emission mechanisms. The X-ray emission is generally described by:

$$\hbar\omega_m = \frac{hc\beta\cos(\theta)}{(n_1 d_1 + n_2 d_2)(1-\beta\cos(\varphi))}\cdot m \tag{2}$$

here, $n_1$ and $n_2$ are respectively the numbers of first and second layers in each of the periodic structures and $d_1$ and $d_2$ are respectively interlayer distance between two adjust layers of first material composition and between two adjust layers of second material composition. Moreover, the inventors have found that proper selection of the periodic layers' arrangement results in preferred emission order (m) associated with resulting X-ray frequency (wavelength).

Further, using the PCB theory, the inventors provide prediction on the width Δω of the spectral peaks in X-ray emission. Generally, for relatively thin MCS the spectral width can be estimated by:

$$\frac{\Delta\omega}{\omega_m} = \frac{\Delta E}{E_m} \approx \sqrt{0.8\frac{d^2}{m^2L^2} + \Delta\varphi_D^2\frac{\beta^2\sin^2\varphi}{[1-\beta\cos\varphi]^2} + \Delta\theta_e^2\tan^2\theta} \tag{3}$$

with L being the electron interaction length in the crystal, $\Delta\varphi_D$ the angular aperture of the detector (associated with spatial width of X-ray emission) and $\Delta\theta_e$ the angular spread of the incident electron beam. This relation indicates a control factor associated with aperture diameter for directing emitted X-ray providing spatial width of emitted X-ray, in addition to MCS and electron beam properties. In some examples, the angular aperture of the energy-dispersive X-ray spectrometer (EDS) used was $\Delta\varphi_D=16°$. The aperture collects the emission for a range of angles φ=113°–129°. It should be noted that typically the left term in the square root of the spectral width relation is comparatively negligible because the crystal thicknesses of the different materials (L~100 nm) may be selected to avoid introducing significant broadening relative to the angular aperture for X-ray. Similarly, $\Delta\theta_e$, being the electron beam divergence angle, is typically lower than 0.1 mRad and thus does not significantly alter Δω. An additional effect of significant broadening is the detector energy resolution (may be around 80 eV), which may affect the measured spectral width over the theoretical prediction.

The spectral width relation shown above may be used to estimate the monochromaticity of the emitted radiation, in a way that is independent parameters of a detector used for measuring the emitted X-ray. Regardless of the aperture angular diameter $\Delta\varphi_D$, PCB radiation generated by a collimated electron beam may generally provide emission with spectral width around $\Delta\omega/\omega_m=0.9$ d/mL, this provides about interaction probability per meter of 1.2/m % and typical interaction length of 100 nm with $WSe_2$. Therefore, when collected over a small angle, the emitted X-rays can be considered as monochromatic X-ray radiation, possessing a narrow bandwidth below 1% for orders m≥2.

Figure 4A:
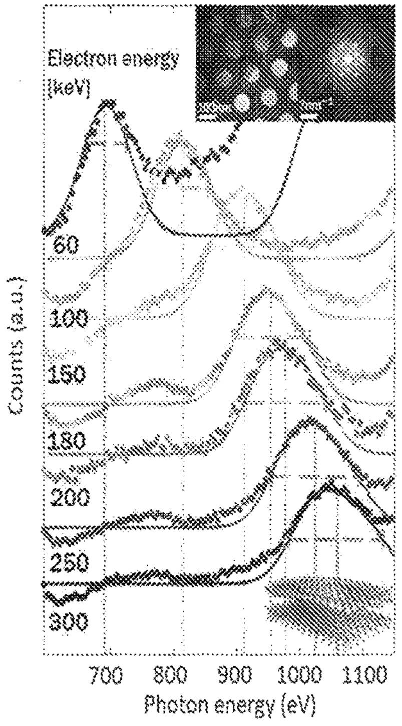

This is illustrated in FIGS. 4A to 4C showing the spectrum of X-ray photons created by electrons of different energies moving along the zone axis of $WSe_2$ MCS (FIG. 4A) and spectrums measured from $MnPS_3$ (FIG. 4B) and $CrPS_4$ (FIG. 4C). In all these Figs the tunability of the spectrum is done by changing the energy of the incident electron beam. As shown, the emitted radiation has peaks at different photon energies depending on the electron kinetic energy (60-300 keV). The experimental results (marked by dots in the graph) are in good agreement both with the theoretical prediction for the peak energy and with the peak width using no fitting parameters. Generally, these results may suggest that PXR may be the stronger X-ray emission mechanism. This is based on comparison of the experimental results with simulations of PXR and CBS mechanisms.

Reference is made to FIG. 5 showing measurement results exemplifying tunability of X-ray radiation from vdW materials based on material selection. FIG. 5 shows radiation spectra emitted from three different MCS formed by vdW materials $FePS_3$, $CoPS_3$, and $NiPS_3$.

Theoretically predicted peak energy values and energy peak widths indicated by the above equations show a good match with experimental results. For example, the constant energy peak in FIG. 4C relates to characteristic radiation peak emitted from copper (marked as "Cu" in the figure). The insets in FIGS. 4A-4C present images and diffraction patterns of each vdW material for crystal orientations ($WSe_2$) in FIG. 4A, ($MnPS_3$) in FIG. 4B and ($CrPS_4$) in FIG. 4C, and 3D models of the layered vdW structures.

The vdW materials used in FIG. 5 have a different lattice constant d in picometer scale. As indicated above, this results in variations in radiation energy of the emitted X-ray. Additionally, the emitted radiation energy is further tuned by modification of the kinetic energies of the incident electron. This provides combined X-ray energy tunability via variation of the structure and of the electron acceleration voltage. The sensitivity of the photon-energy tuning is high, as the energy is limited only by the energy resolution and angular aperture of the detector.

As indicated above, the present technique is based on the inventors' understanding of BCS and PXR mechanisms as providing X-ray emission in response to interaction of vdW material with electron beam passing through the material. The technique of the invention utilizes multilayered crystal structure (MCS) and the above models enabling X-ray emission with increased brightness values. For example, examining brightness values obtainable by the present technique using TEM based electron source the brightness is compared favorably with state-of-the-art X-ray tubes, while the input power is smaller by a factor of $10^{-5}$ to $10^{-8}$. More specifically, in this example the electron beam provides a relatively low electron current of about InA and about 1 nm electron beam diameter at the plane of the sample passing through a $WSe_2$ sample of about 100 nm thickness. For detector orientation of $\varphi=121°$ with respect to the electron velocity, the brightness value is about $$\sim 1\cdot 10^9 \frac{\text{photons}}{s\cdot m\text{rad}^2\cdot \text{mm}^2\cdot 0.1\%\ BW}.$$

This is within the range of energy tunability of about 700-1100 eV. Additionally, the present technique provides generally directional emission, and further tunable as compared to radiation from X-ray tubes (which is either characteristic or bremsstrahlung). For example, the estimated numbers of photons detected at the detector's solid angle at each peak between 60 keV and 300 keV as shown in FIG. 4A is: $4\times10^3$, $2.6\times10^3$, $1.8\times10^3$, $1.5\times10^3$, $1.4\times10^3$, $1.1\times10^3$, and $1.0\times10^3$ photons/(s·eV) respectively. The typical photon count per second determined by integration over width of the peak is ~$10^5$.

Generally, the brightness of energy converter unit (operating as X-ray source) of the present technique can be further improved by optimizing parameters such as the detector orientation and size, electron acceleration voltage, and the sample thickness. Further, increase in electron current combined with reduced electron spot size. It should be noted that generally, electron current and spot size are to be kept in compromise based on the tradeoff enforced by Coulomb repulsion (space charge), which leads to greater beam divergence and smaller interaction length, with larger electron density.

Figure 6:
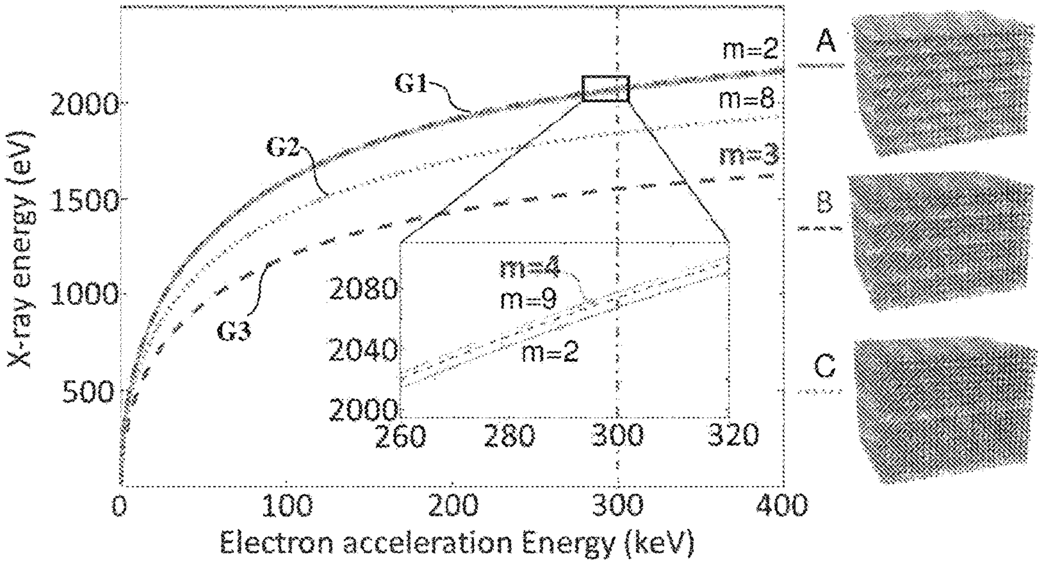
FIG. 6 shows variation of X-ray emission energy based on layers' arrangement according to some embodiments of the invention.
Figure 7:
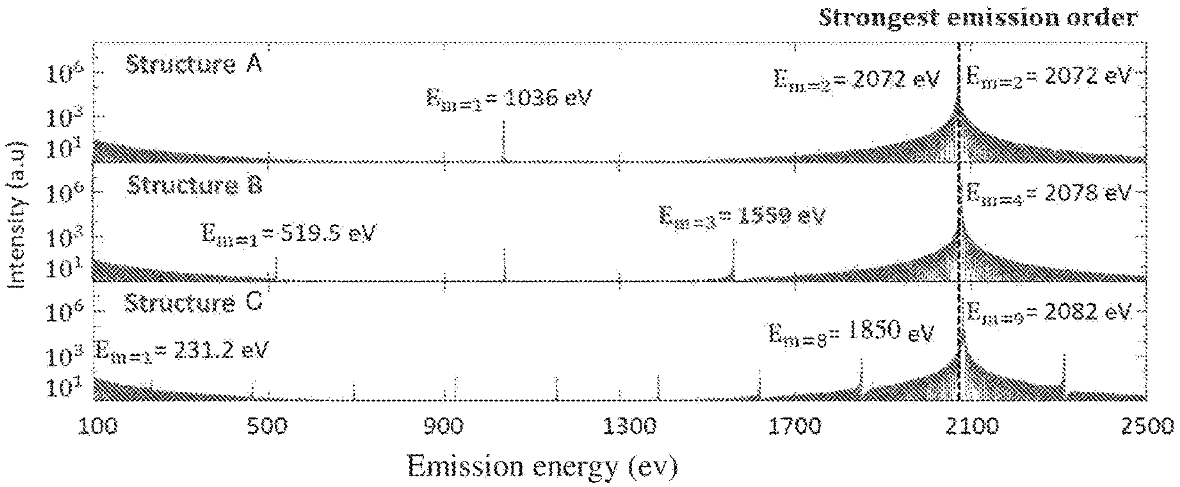
FIG. 7 exemplifying full emission spectra simulated using electron beam having kinetic energy of 300 keV.

Additionally, as indicated above, the present technique utilizes a multilayer crystal structure (MCS) having selected layer structure for providing selected X-ray emission properties. As shown above, emission properties may be determined by crystal structure, and specifically interlayer distance of the lattice constant, and may also be associated with emission order m. Reference is made to FIG. 6 exemplifying variation in emission order, and accordingly emission wavelength in accordance with layers' arrangement of the multilayer crystal structure. FIG. 6 shows emitted X-ray energy in eV (associated with emission wavelength/frequency) with respect to electron beam acceleration voltage for three samples of multilayer crystal structures G1, G2 and G3. The sample are formed of graphite ($d_1$=0.3308 nm) and hexagonal boron nitride ($d_2$=0.3350 nm) layers. Plot G1 includes three graph plot almost overlapping, where main sample is formed by alternating layers of the first and second material compositions, i.e. n1=1, n2=1, additional graph plots are indicated in the inset having m=4 and m=9; sample G2 is formed by similar material compositions where n1=3, n2=1; sample G3 is of the same material composition, with layers' arrangement n1=8, n2=1. Further, the resulting X-ray emission is associated with preferred emission order. More specifically, sample G1 provides maximal emission for emission order m=2, sample G2 provides maximal emission for emission order m=3, and sample G3 provides maximal emission for emission order m=8. Simulation of the emission spectra indicates that the most dominant order of emission may be determined as m=n1+n2 of the structure of the MCS. This is illustrated in FIG. 7 showing full emission spectra simulated using electron beam having kinetic energy of 300 keV. This simulated result indicates that the most dominant order of emission for each structure is determined by $m=n_1+n_2$.

It should be noted that additional layer arrangements may be used in accordance with desired emission wavelength and material compositions. For example, the multilayer crystal structure may be formed with $n_1$ and $n_2$ selected from 1-10. For example using the following layers combination such as $n_1=2$, $n_2=2$; $n_1=3$, $n_2=2$; $n_1=4$, $n_2=2$; $n_1=5$, $n_2=2$; $n_1=6$, $n_2=2$; $n_1=7$, $n_2=2$; $n_1=8$, $n_2=2$; $n_1=9$, $n_2=2$; $n_1=10$, $n_2=2$; as well as similar values of $n_1$ for $n_2$ values. In some configurations the layers' arrangement may include gradual variation of the number of layers $n_1$ or $n_2$. Such gradual variation may be used for providing a lensing effect, where emitted X-ray radiation is directed to be focused onto selected region rather than propagating as plane wave. For example, such lensing configuration may be providing with layers' arrangement where $n_1$ varies from a selected number and grows toward center of the multilayered crystal structure, and then reduces again, this is while $n_2$ may be kept unchanged. For example, an order of layers where $n_1=2$, $n_2=5$; $n_1=3$, $n_2=4$; $n_1=4$, $n_2=3$; $n_1=5$, $n_2=4$; $n_1=4$, $n_2=3$; $n_1=3$, $n_2=4$; $n_1=2$, $n_2=5$. Gradual variation of distances between the segments, and the distance between the layers may also be obtained by applying bend on the multilayer crystal structure. As the electron beam propagates through the bent crystal the effective structure periodicity that effects the electrons varied within cross section of the beam or along propagation of the beam.

Figure 8:
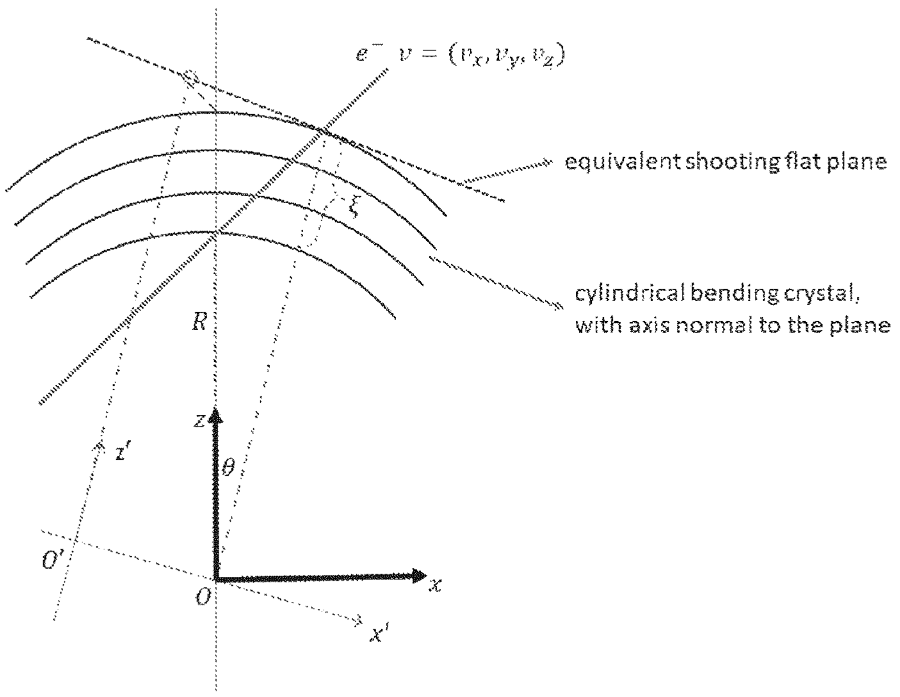
FIG. 8 is a schematic illustration of bent multilayer crystal structure according to the present technique, where bending of the MCS enables further tuning of the emitted radiation.

This technique is exemplified in FIG. 8, showing a schematic illustration of a MCS layers bent to form a cylindrical segment of radius R. The electron beam $e^-$ is transmitted along propagation vector with velocity $v=(v_x, v_y, v_z)$, and thus along passage of the electrons within the MCS, the distance between the layers differs. Axes x, z, and x',z' are shown to illustrate the bending and relative direction of propagation of the electron beam. In such configuration, the focal distance of the emitted radiation is given by:

$$X(\theta) = x - \frac{\sin\theta}{\beta_x \cos\theta - \beta_z \sin\theta}(R\beta_x - \beta_z r_{ex})$$

$$Y(\theta) = y - \frac{R\sin\theta - r_{ex}\cos\theta}{\beta_x \cos\theta - \beta_z \sin\theta}\beta_y - r_{ey}$$

$$Z(\theta) = z - \frac{\cos\theta}{\beta_x \cos\theta - \beta_z \sin\theta}(R\beta_x - r_{ex}\beta_z)$$

where R is the bend radius of a cylindrical crystal, $r_{ex}$ and $r_{ey}$ are the radii of the incident electron beam along x and y axes, and x,y,z are the space coordinates as defined in FIG. 8 where axis y is directed into the figure.

The energy converter and the multilayer crystal structure of the present technique may also be operable for providing X-ray emission extended into the hard X-ray regime. To this end, the energy converter may require higher electron energies, e.g. within 1 MeV to 5 MeV or more. Typically, electron beams generated by photoemission injectors based on RF guns and DC high voltage guns may be generated with electron currents of up to tens of mA in acceleration voltages of a few MeV, thus providing electron beams that improves the emission brightness from thicker MCS.

The performance of PCB radiation mechanisms associated with vdW materials as described above can be also viewed from the perspective of energy transfer and efficiency. For example, the probability that an electron of 60 keV energy passing through a 100 nm interaction length in vdW material (such as $WSe_2$) will produce photons by PCB emission is about $10^{-4}$. This results in an average electron energy loss to PCB of 0.25 eV. Out of this, the probability of radiation in the direction of the detector is about $10^{-5}$, i.e., electron energy loss to "useful X-ray photons" of 0.025 eV. This probability is on the same order of magnitude as is found in related processes such as Smith-Purcell radiation. However, using the MCS of the present technique, the electron energy may be reused, increasing the efficiency of radiation conversion. Recycling the electron energy results in that the absolute efficiency depends on competing channels of energy loss in the sample. In the case of PCB radiation, such processes mainly come from Coulomb collisions that result in the excitation of other electrons, ionization of atoms and bremsstrahlung radiation. The total energy loss may be estimated by numerical simulation indicating that a 60 keV electron interacting with a 100 nm MCS, results in average energy loss of ~300 eV. Therefore, the efficiency of the mechanism may be predicted to be about 0.1% (for the example of 60 keV electrons and 100 nm $WSe_2$ MCS).

At higher energies, the efficiency improves as the radiation is more directional due to relativistic contraction. In addition, higher electron energies also have longer penetration depths in thicker samples and lower competing loss channels. Overall, such efficiency can be tolerable when considering state of the art conventional X-ray sources, which similarly have limited efficiency.

Generally, each layer in the MCS according to the present technique may be an atomic layer. More specifically, the multilayer structure may be generated using layer-by-layer growth where each layer is formed of a selected material composition. Each layer is generally formed of atomic or ionic material composition such as graphene, hexagonal Boron nitride (hBN), $WSe_2$, $CrPS_4$, $FePS_3$, $MnPS_3$, $NiPS_3$, $CoPS_3$, $MoS_2$, InAr, GaSb, Mo, Si, $WSe_2$, Bulk tungsten (W) as well as III-V materials such as GaAs, InP, etc., group III-Nitrides and III-V-Nitrides materials such as Si, NaCl, GaP, InP, SiC, W, ZnO, $MgAl_2O_4$, $TiO_2$, MgO etc. The different layers may be held forming a MCS by covalent or ionic interactions, or in some configurations the different layers may be held by van der Waals interactions between the layers. Generally, in some configurations, the MCS may be formed by a layered arrangement of van der Waals materials.

For example, in some configurations the MCS may be produced by various Epitaxial growth methods using different material compositions in accordance with desired emission properties. For example, the MCS may be produced by Molecular Beam Epitaxy using group III-V materials (e. g., such as GaAs, InP, etc.); group III-Nitrides and III-V-Nitrides (such as Si, NaCl, GaP, InP, SiC, W, ZnO, $MgAl_2O_4$, $TiO_2$, MgO etc.).

Additional Epitaxial growth methods may include: Liquid-Phase Epitaxy using group IV material (e.g. silicon, Silicon Carbide, Silicon/Germanium, etc.), group III-V materials (e.g. Arsenic- and Phosphorus-Based Materials, III-V Antimonides etc.), Group III Nitrides. Group II-Vi materials (such as Wide gap Compounds, MCT (Mercury Cadmium Telluride), Garnets, Oxides/Fluorides, Atomically Flat Surfaces etc.). The MCS may also be formed by Metal Organic Chemical Vapor Deposition using material and sub methods as known in the art (III-V MOCVD, Antimonides, Nitrides, II-VI MOCVD, Sulfides and Selenides, MOCVD of Group II Oxides etc.).

Additionally, the multilayer crystal structure may be produced using Van-der-Walls heterostructure stacking and growing technique. Such techniques may be used with any vdW material such as: $WSe_2$, $MoS_2$, $WS_2$, $MoO_3$, hBN, graphene etc., as well as in multilayered crystal material formed by ionic and/or covalent interactions between the layers. Additional production techniques may include atomic layer deposition and ALD based methods, and sonication assisted synthesis.

Additionally, the MCS may be produced by Alloys, alloyed material synthesis and various alloyed based material design methods, as well as doping techniques, being individual doping methods and/or doping techniques combined with any of the above-mentioned methods.

Thus, as indicated above, the present technique enables design of an energy conversion unit suitable for use in X-ray radiation source. The technique is based on the use of a multilayered crystal having specific design of periodic crystal lattice structure providing emission by PCB (combined Coherent bremsstrahlung and Parametric X-ray radiation) or PXR\CB mechanism. The layers' arrangement provides for efficient energy conversion and emission of X-ray radiation in response to excitation by electrons of varying energies. This allows the use of different electron velocities being relativistic or non-relativistic, while the latter provides soft-X-ray spectrum and the former results in emission of hard X-ray spectrum. The design may be based on collected data in preferred emission modes m in accordance with layers' arrangement and material composition of the layers, as well as the above described formula indicating theoretical prediction of emission wavelength based on electron velocity and layers' arrangement.

The present technique may thus provide an energy converter unit suitable for use in various radiation emission applications. The technique enables providing a compact, high quality and tunable X-ray source. Such compact X-ray source may be used in full field transmission electron microscopes and Scanning transmission X-ray microscopy (STXM), providing full spectral range sources for high resolution microscopy biology, biophysics, medicine, material, and environmental sciences. It should be noted that the X-ray source may be configured with a dedicated mount for MCS within path of electron beam, and rotating mechanism enabling selectively switching the MCS used in accordance with desired spectrum properties of the X-ray radiation.

Additionally, the present technique may be used to provide accurate energy soft X-ray radiation where selected low energy electrons are used to provide relatively long wavelength X-ray radiation. Such X-ray source may be used as light sources for X-ray Photoemission electron Microscopy (XPEEM) and for scanning photoelectron microscopy (SPEM). The convention known techniques typically use synchrotron radiation in order to produce X-ray of the specific required energy, being highly bulky and complex.

Further, the present technique enables emission of coherent X-ray radiation. This is achieved by providing an electron beam formed by nano-modulated electrons. This provides coherent X-ray emission formed by interactions of the plurality of electrons with the MCS. Such nano-modulated electrons may be produced by emittance exchange techniques, laser plasma interactions and/or electromagnetic intensity gratings and more.

Generally, utilizing tunable and optimized emission spectrum using the present technique, X-ray source system may optimize the spectrum to achieve high quality imagining with low radiation dose for the patient or sample. Altering the energy of the X-ray allows highlighting different features of a tissues, different in composition and thickness.

For example, this may provide for efficiency improved mammography techniques. Mammography units designed using tunable quasi-monochromatic X-ray source as described above may improve the imaging resolution, lower the radiation dose delivered to the patient and improve the false diagnosis rate of X-ray production methods used today. This is similar for tomography techniques that may benefit from the tunability, monochromatic energy and coherency features of PCB radiation. Experiments showed the high spatial resolution achievable, as well as background fluorescence reduction, object density inspection and other advantages of PCB radiation in techniques such as: X-ray diffraction tomography, Phase-contrast tomography, Computer aided tomography. X-ray cancer treatments may be energetically tailored using the present technique to a specific patient and medical diagnostic in order to minimize the radiation dose transferred to the patient while maximizing the efficiency of the treatment.

The present technique may also be advantageously used on Industry imaging applications such as Imaging Wafers or chips with known thickness and material composition. Fine tuning of the radiation used for imaging may be used for highlighting different parts of the imaged system. Using pulsed signals to inspect production processes as well as electrical thermal and mechanical processes. In X-ray crystallography the PCB effects may occur over short time scales, enabling applying high time resolution crystallography methods using tailored radiation energy levels.

Additionally, as indicated above, the present technique enables production of PCB coherent, tunable, quasi-monochromatic X-ray radiation with wide energy spectral range that is essential for study of complex materials, magnetic materials as well as in environmental and catalysis studies using many X-ray spectroscopy and X-ray scattering techniques such as: Extended X-Ray Absorption Fine Structure spectroscopy (EXAFS), X-ray absorption near edge structure spectroscopy, X-ray emission structure spectroscopy, X-ray photo-emission spectroscopy, X-ray magnetic circular dichroism, Soft X-ray emission spectroscopy (SXES), Inelastic X-ray scattering (IXS), Resonant X-ray inelastic scattering (RIXS), Small angle X-ray scattering (SAXS) and others Further, the present technique may be used for additional applications such as: Electronics inspections, Pharma quality insurance, Food security, Lithography based on X-ray sources, Crystalline purity of samples, Characterizing how pure is a sample in terms of material composition and crystallinity, Detecting doping rate, Detection of crystal defected areas and the rate of defects, Drug inspection with tunable X-ray source based on specific designed superlattices, Food inspection with tunable X-ray source based on specific designed superlattices, Security inspections for hazardous and suspicious materials, detection and concentration measurements, Heat treatment inspections and control.

The Present invention also provides a method for designing a resonant structure suitable for enhancing emitted X-ray radiation from periodic lattice structure. The resonant structure is configured to improve emission efficiency from low efficient PCB process. The technique includes determining transition and reflection of plane wave incident on a dipole array, e.g. based on analytic description of a modeled structure. The dipole array is used to model an atomic crystal excited by external fields. The plane wave result can be further used to calculate the radiation generated by an electron passing through a dipole array. A quantum treatment of such effect can be done through the transition current approach.

The resonant structure may generally be configured as a superlattice periodic structure designed to match the dominant diffraction lines of the incident electron and the dominant diffraction lines of the emitted X-ray photons. The matching conditions combine the separate diffraction conditions of both electrons and X-ray photons.

The resonant structure may be described theoretically in accordance with "dipole model" in which each lattice site is considered as dipole, describing the electrical field emitted in the interaction of a propagating charged particle and the periodic lattice structure.

Generally, the full field is described by the equation:

$$E(r;k)=\overline{\overline{D}}(r-r';k)p(r')+\overline{\overline{D}}(r;k)[\alpha_a^{-1}I-\overline{\overline{D}}(0;k)]^{-1}\overline{\overline{D}}(-r';k)p(r') \quad (5)$$

And the scattered field which is of interest to us is described by:

$$E^{scat}(r)=E(r)-\overline{\overline{D}}(r,r')p(r')=\frac{V_{u,c}}{8\pi^3}\int_{BZ}dk\overline{\overline{D}}(r;k)=\left[\alpha_a^{-1}I-\overline{\overline{D}}(0;k)\right]^{-1}\overline{\overline{D}}(u_a-r';k)p(r') \quad (6)$$

For majority of cases the matrix is reversible, however, the resonance condition accrues for a non-reversible (its determinant equals zero).

The electron field according to the dipole model is derived from Maxwell equations to provide wave equation:

$$\left(\nabla\times\nabla\times-\epsilon\frac{\omega^2}{c^2}\right)E(r)=\mu_0\omega^2p(r')\delta(r-r') \quad (7)$$

Using Green's function formalism:

$$E(r)=\mu_0\omega^2\overline{\overline{G}}(r,r';w)p(r') \quad (8)$$

This solution will stand for each frequency independently to the others, so the notation herein below omits the writing of w. Each lattice position is marked with index i, so that $r_i=n_ia+m_ib+l_ic$ where a, b, c are the lattice vector and $n_i$, $m_i$, $l_i$ are in Z={0, +1, −1, +2, −2, . . . }

Using $\delta(r-r')=\frac{V_{u,c}}{(2\pi)^3}\int_{BZ}dk\sum_i\delta(r-r'-r_i)e^{ik\cdot r_i}$ where $V_{u.c}$ is the unit cell volume, BZ denotes the Brilluin zone. This provides $$\left(\nabla\times\nabla\times-\epsilon\frac{\omega^2}{c^2}\right)E(r)=\mu_0\omega^2p(r')\frac{V_{u,c}}{(2\pi)^3}\int_{BZ}dk\sum_i\delta(r-r'-r_i)e^{ik\cdot r_i} \quad (9)$$

By linearity, this expression provides:

$$E(r)=\frac{V_{u,c}}{(2\pi)^3}\int_{BZ}dke^{ir\cdot k}E(k)=\frac{V_{u,c}}{(2\pi)^3}\int_{BZ}dkE(r,k). \quad (10)$$

Here, the field's momentum, defined as $E(k)=\int_r dre^{-ir\cdot k}E(r)$, is limited inside the Brillium zone, hence the wavelength is limited to be larger than twice the lattice periodicity in every dimension ($\lambda>2a_x$, $2a_y$, $2a_z$). providing that this equality (and the rest of this mathematical development) is generally correct only for a 3D lattice, a response from a lattice with a lower dimension is derived further below. In the 3D lattice case, the connection between the field and the exciting dipole provides that:

$$\left(\nabla\times\nabla\times-\epsilon\frac{\omega^2}{c^2}\right)E(r,k)=\mu_0\omega^2p(r')\sum_i\delta(r-r'-r_i)e^{ik\cdot r_i}. \quad (11)$$

In other words, each E(k) is the field created by a phased array of dipoles that are Bloch periodic.

Assuming lone dimensional lattice geometry of particles with polarizability $\alpha(\omega)$. In general, each cell can contain more than one atom and the atom can be of different species and, thus, have different polarizabilities. Accordingly, $\alpha_a(\omega)$ is the polarizability of the atom in the cell that is indexed by a. Also, assuming that the position of the a-th atom of the i-th cell to be $r_{i,a}=r_i+u_a$. Thus, the field in r is the sum of the external field $E^{ext}(r)$ and the induce dipoles in the lattice, $$E(r)=E^{ext}(r)+\Sigma_{i,a}\overline{\overline{D}}(r,r_{i,a})p_{i,a}, \quad (12)$$

where $\overline{\overline{D}}$ is the free space green's function multiplied by $\mu_0\omega^2$. The external field could be defined as a contribution from a phased array at $\{R_i=r_j+r'\}$, through its Fourier transform $$E^{ext}(r;k)=p(r')\Sigma_j\overline{\overline{D}}(r,R_j)e^{ik\cdot r_j}. \quad (13)$$

The dipole p(r') in the definition of $E^{ext}(r, k)$ is the same one that was used above and is the source of the general external field. This dipole parameter it is different than $p_{i,a}$ which indicates the lattice dipoles. Using crystal structure, $E^{ext}$ can be described as Bloch periodic function:

$$E^{ext}(r+r_i,k)=p(r')\sum_j\overline{\overline{D}}(r+r_i,r_j+r')e^{ik\cdot r_j}=p(r')\sum_j\overline{\overline{D}}(r,r_j-r_i+r')e^{ik\cdot r_j}=e^{ik\cdot r_i}p(r')\sum_j\overline{\overline{D}}(r,r_j+r')e^{ik\cdot r_j}=E^{ext}(r,k). \quad (14)$$

Using Fourier transform for the Green's function, $\overline{\overline{D}}(r;k)=\Sigma_j\overline{\overline{D}}(r,r_j)e^{ik\cdot r_j}$, so that $E^{ext}(r,k)=\overline{\overline{D}}(r-r';k)p(r')$. it should be noted that $\overline{\overline{D}}(r;k)$ is itself also Bloch periodic, since $\overline{\overline{D}}(r_i;k)=\Sigma_j\overline{\overline{D}}(r_i,r_j)e^{ik\cdot r_j}=\Sigma_j\overline{\overline{D}}(0,r_j-r_i)e^{ik\cdot r_j}=e^{ik\cdot r_i}\overline{\overline{D}}(0;k)$.

The field in E(r, k) can now be expressed as:

$$E(r,k)=E^{ext}(r,k)+\sum_{i,a}\overline{\overline{D}}(r-r_i-u_a;k)p_{i,a}=E^{ext}(r,k)+\sum_a\overline{\overline{D}}(r-u_a;k)\sum_i e^{-ik\cdot r_i}p_{i,a}=E^{ext}(r,k)+\sum_a\overline{\overline{D}}(r-u_a;k)p_a(k) \quad (15)$$

where $p_a(k)=\Sigma_ie^{-ik\cdot r_i}p_{i,a}$ is the collective movement of the a-th atoms with a wavevector k. Here was the first use of the lattice when deciding that the dipoles in the lattice and the "dipole array" (used for defining E(r, k), $E^{ext}$ (r, k)) have the same structure and choosing the same $\overline{\overline{D}}(r;k)$ in all the expressions.

For an explicit expression of the exciting dipole, the induced dipoles should be described. The induced dipoles satisfy $$p_{i,a}=\alpha_a[E^{ext}(r_{i,a})+\Sigma_{j\neq i}\overline{\overline{D}}(r_{i,a},r_{j,a})p_{j,a}+\Sigma_{j,b\neq a}\overline{\overline{D}}(r_{i,a},r_{j,b})p_{j,b}]. \quad (16)$$

The first term is $$E^{ext}(r_{i,a}) = \frac{V_{u,c}}{(2\pi)^3}\int_{BZ} dk E^{ext}(k, r_{i,a}),$$

its Fourier transforms gives $$\sum_i e^{-ik\cdot r_i}\frac{V_{u,c}}{(2\pi)^3}\int_{BZ} dk' E^{ext}(r_{i,a}, k') = p(r')\frac{V_{u,c}}{(2\pi)^3}\int_{BZ} dk' \sum_i e^{-ik\cdot r_i}\bar{\bar{D}}(r_i + u_a - r'; k') = p(r')\frac{V_{u,c}}{(2\pi)^3}\int_{BZ} dk' \bar{\bar{D}}(u_a - r'; k')\sum_i e^{-ik\cdot r_i}e^{ik\cdot r_i} = p(r')\bar{\bar{D}}(u_a - r'; k). \quad (17)$$

The second term is $$\Sigma_i e^{-ik\cdot r_i}\Sigma_{j\neq i}\bar{\bar{D}}(r_{i,a}, r_{j,a})p_{j,a} = \Sigma_j\Sigma_i e^{-ik\cdot r_i}\bar{\bar{D}}(-r_j - r_i)p_{j,a} = \Sigma_j \bar{\bar{D}}(-r_j; k)p_{j,a} = \bar{\bar{D}}(0;k)\Sigma_j e^{-ik\cdot r_j}p_{j,a} = \bar{\bar{D}}(0;k)p_a(k) \quad (18)$$

taking in the first step $\bar{\bar{D}}(0, 0)=0$, meaning no self-interaction.

The third term is $$\Sigma_i e^{-ik\cdot r_i}\Sigma_{b\neq a}\bar{\bar{D}}(r_{i,a}, r_{j,b})p_{j,b} = \Sigma_{j,b\neq a}p_{j,b}\Sigma_i e^{-ik\cdot r_i}\bar{\bar{D}}(u_a - u_b - r_j - r_i) = \Sigma_{j,b\neq a}p_{j,b}\bar{\bar{D}}(u_a - u_b - r_j; k) = \Sigma_{b\neq a}\bar{\bar{D}}(u_a - u_b; k)\Sigma_j p_{j,b}e^{-ik\cdot r_j} = \Sigma_{b\neq a}\bar{\bar{D}}(u_a - u_b; k)p_b(k). \quad (19)$$

In total, $$p_a(k) = \alpha_a[p(r')\bar{\bar{D}}(u_a - r'; k) + \bar{\bar{D}}(0;k)p_a(k) + \Sigma_{b\neq a}\bar{\bar{D}}(u_a - u_b; k)p_b(k)]. \quad (20)$$

Assuming that in every frequency there is only one dominant dipole in the unit cell $p_a(k)$, with polarizability of $\alpha_a$, so that the equation above gets the form of:

$$p_a(k) = \alpha_a[p(r')\bar{\bar{D}}(u_a - r'; k) + \bar{\bar{D}}(0;k)p_a(k)]$$

$$p_a(k) = [\alpha_a^{-1}I - \bar{\bar{D}}(0;k)]^{-1}\bar{\bar{D}}(u_a - r'; k)p \quad (21)$$

Thus, having solved $$\left(\nabla\times\nabla\times - \epsilon\frac{\omega^2}{c^2}\right)E(r) = \mu_0\omega^2\sum_i \delta(r - R_i)e^{ik\cdot r_i}p(r')$$

for each k. The result is:

$$E(r,k) = \bar{\bar{D}}(r - r'; k)p(r') + \bar{\bar{D}}(r;k)[\alpha_a^{-1}I - \bar{\bar{D}}(0;k)]^{-1}\bar{\bar{D}}(-r'; k)p(r') \quad (22)$$

The first term is the trivial dipole response. In general, the actual interest is in the scattering field:

$$E^{scat}(r) = E(r) - \bar{\bar{D}}(r, r')p(r') = \frac{V_{u,c}}{8\pi^3}\int_{BZ} dk\bar{\bar{D}}(r;k) = \left[\alpha_a^{-1}I - \bar{\bar{D}}(0;k)\right]^{-1}\bar{\bar{D}}(u_a - r'; k)p(r') \quad (23)$$

Therefore, the scattering Greens function is:

$$\bar{\bar{G}}^{scat}(r, r') = \frac{V_{u,c}}{8\pi^3}\int_{BZ} dk\bar{\bar{D}}(r;k) = \left[\alpha_a^{-1}I - \bar{\bar{D}}(0;k)\right]^{-1}\bar{\bar{D}}(u_a - r'; k) \quad (24)$$

Considering $\bar{\bar{D}}(r; k)$ based on definition and the Bloch periodicity properties shown above:

$$\bar{\bar{D}}(r;k) = \Sigma_j\bar{\bar{D}}(r, r_j)e^{ik\cdot r_j} \quad (25)$$

$$\bar{\bar{D}}(r_i + r; k) = e^{ik\cdot r_i}\bar{\bar{D}}(r;k)$$

It is Bloch periodic and knowledge of it in one unit-cell yields knowledge of it everywhere.

Any Bloch periodic function takes the form $g(r)=e^{ik\cdot r}u(r)$ where $u(r)=u(r+r_i)$, so that $g(r+r_i)=e^{ikr_i}g(r)$.

It can be written as $\bar{\bar{D}}(r; k)=e^{ik\cdot r}\bar{\bar{U}}(r; k)$. Then, in case of one atom in the cell:

$$\bar{\bar{G}}^{scat}(r, r') = \frac{V_{u,c}}{8\pi^3}\int_{BZ} dk e^{ik\cdot(r - r')}\bar{\bar{U}}(r'; k)\left[\alpha_a^{-1}I - \bar{\bar{D}}(0;k)\right]^{-1}\bar{\bar{U}}(u_a - r'; k) \quad (26)$$

Simplification and implementation method.

Note that $\bar{\bar{D}}$ is the free space green's function:

$$\bar{\bar{D}}(r, r'; \omega) = \bar{\bar{D}}(r - r'; \omega) = \bar{\bar{D}}(\Omega; \omega) = \mu_0\omega^2\left(\nabla\otimes\nabla' - \frac{\omega^2}{c^2}I\right)\frac{e^{\frac{i\omega}{c}\Omega}}{4\pi\Omega} = -\mu_0\omega^2\frac{\delta(\Omega)I}{3k_0^2} - \mu_0\omega^2\frac{e^{ik_0\Omega}}{4\pi\Omega^3k_0^2}\{[1 - ik_0\Omega - (k_0\Omega)^2]I - [3 - 3ik_0\Omega - (k_0\Omega)^2]e_\Omega e_\Omega\} \quad (27)$$

where $$k_0 = \frac{\omega}{c} \text{ and } e_\Omega = \frac{r - r'}{|r - r'|} = \Omega/\Omega$$

(In a bulk medium $$k_0 = \sqrt{\epsilon}\frac{\omega}{c}$$

with $\mathrm{Im}k_0>0$).

Assuming r≠r', the free space Green's function becomes $$\frac{\bar{\bar{D}}(r, r'; \omega)}{\mu_0\omega^2} = -\frac{e^{ik_0\Omega}}{4\pi\Omega^3k_0^2}\{[1 - ik_0\Omega - (k_0\Omega)^2]I - [3 - 3ik_0\Omega - (k_0\Omega)^2]e_\Omega e_\Omega\}.$$

$$\frac{\bar{\bar{D}}(r;k)}{\mu_0\omega^2} = -\sum_j e^{ik\cdot r_j}\frac{e^{ik_0\Omega}}{4\pi\Omega^3k_0^2}\{[1 - ik_0\Omega - (k_0\Omega)^2]I - [3 - 3ik_0\Omega - (k_0\Omega)^2]e_\Omega e_\Omega\} \quad (28)$$

When looking at the far field, one may also assume r much larger than the size of the piece $V^{1/3}$, so that $$|\Omega_j| = \Omega_j = |r - r_j| = \sqrt{r^2 + r_j^2 - 2r\cdot r_j} = r\sqrt{1 + r_j^2/r^2 - 2\frac{r\cdot r_j}{r^2}} \cong r - \hat{r}\cdot r_j \quad (29)$$

Substituting this result in the phase term of the Fourier transform of the Green's function, while approximating $\Omega_j \cong r$ in the rest of the expression (including $e_{\Omega_j}=\hat{r}$):

$$\frac{\bar{\bar{D}}(r;k)}{\mu_0\omega^2} = -e^{ik_0 r}\sum_j \frac{e^{i(k-k_0\hat{r})\cdot r_j}}{4\pi r^3 k_0^2}\left\{\left[1-ik_0 r-(k_0 r)^2\right]I-\left[3-3ik_0 r-(k_0 r)^2\right]\hat{r}\hat{r}\right\}. \tag{30}$$

Next, using $$\sum_j e^{i(k-k_0\hat{r})\cdot r_j} = \frac{1}{V_{u,c}}\int d^3x\, e^{i(k-k_0\hat{r})\cdot x} = \delta(k-k_0\hat{r})\frac{8\pi^3}{V_{u,c}}$$

and $k_0r>>1$, in order to get the convenient formula, $$\bar{\bar{D}}(r;k) = \mu_0\omega^2\delta(k-k_0\hat{r})\frac{8\pi^3}{V_{u,c}}\frac{e^{ik_0 r}}{4\pi r}[\hat{r}\hat{r}-I]. \tag{31}$$

Substituting this result into Eq. (1), the scattering Green's function becomes:

$$\bar{\bar{G}}^{scat}(r,r') = \mu_0\omega^2\frac{e^{ik_0 r}}{4\pi r}[\hat{r}\hat{r}-I]\left[\alpha_a^{-1}I-\bar{\bar{D}}(0;k_0\hat{r})\right]^{-1}\bar{\bar{D}}(u_a-r';k_0\hat{r}) \tag{32}$$

Now, to get a simplified expression for the scattering Green's function that contains $\bar{\bar{D}}(0; k)$, for which the assumption above cannot be used. The choice of r=0 leads to $$\bar{\bar{D}}(0;k) = -\mu_0\omega^2\sum_j \frac{e^{ik\cdot r_j}e^{ik_0|r_j|}}{4\pi r_j^3 k_0^2}\left\{\left[1-ik_0 r_j-(k_0 r_j)^2\right]I-\left[3-3ik_0 r_j-(k_0 r_j)^2\right]\hat{r}_j\hat{r}_j\right\},$$

when using $\Omega_j=r_j$.

Assuming that polarizability is small enough so that $\alpha_a^{-1}>>|\bar{\bar{D}}_{mn}(0;k)|$ for every matrix element $\bar{\bar{D}}_{mn}$ (this should be checked before continuing). So that the expression for the $0^{th}$ order Taylor expansion in alpha of the scattered Green's function is $$\bar{\bar{G}}^{scat}(r,r') = \mu_0\omega^2\alpha_a\frac{e^{ik_0 r}}{4\pi r}[\hat{r}\hat{r}-I]\bar{\bar{D}}(-r';k_0\hat{r}), \tag{33}$$

while the $1^{st}$ order Taylor expansion in alpha of the scattered Green's function is $$\bar{\bar{G}}^{scat,1}(r,r') = \mu_0\omega^2\alpha_a\frac{e^{ik_0 r}}{4\pi r}[\hat{r}\hat{r}-I]\left[I+\alpha_a\bar{\bar{D}}(0;k_0\hat{r})\right]\bar{\bar{D}}(-r';k_0\hat{r}). \tag{34}$$

Without assuming anything regard the excitation dipole location, the expression will contain one summation over all unit cells:

$$\bar{\bar{G}}^{scat,0}(r,r') = -\mu_0\omega^2\alpha_a\frac{e^{ik_0 r}}{4\pi r}[\hat{r}\hat{r}-I]\sum_j \frac{e^{ik_0\Omega'_j}e^{ik_0\hat{r}\cdot r_j}}{4\pi\Omega'^3_j k_0^2} \tag{35}$$

-continued $$\left\{\left[1-ik_0\Omega'_j-(k_0\Omega'_j)^2\right]I-\left[3-3ik_0\Omega'_j-(k_0\Omega'_j)^2\right]e_{\Omega'_j}e_{\Omega'_j}\right\}$$

where $|\Omega'_j| = \Omega'_j = |-r'-r_j|$.

Lower Dimension Lattice Response

The lattice response for a lower dimension lattice before converting the equations into k-space have the form of:

$$E(r)=D(r,r')p(r')+\Sigma_{j,b}D(r,r_{j,b})p_{j,b} \tag{36}$$

$$p_{i,a}=\alpha_a[D(r_{i,a},r')p(r')+\Sigma_{b\neq a,j}D(r_{i,a},r_{j,b})p_{j,b}+\Sigma_{j\neq i}D(r_{i,a},r_{j,a})p_{j,a}] \tag{37}$$

Equation 36 is the connection between the electric field in r, as a result of a dipole in r' and a set of dipoles of type b located in a $u_b$ offset from the center of unit cell j ($r_j$). Equation 37 is derived from evaluating the dipole $p_{i,a}$ (with polarizability matrix $\alpha_a$) as a result of the field in $r_{i,a}$ caused by the sum of a dipole in r' and the rest of the lattice dipole located in $r_{j,b}$. In total, the number of equations in this set of equations is N+1, where N is the number of dipoles in the lattice (#unit cells times #atoms in each cell). From this set of linear equations, including the derivations done above, the electric field caused by a lattice of dipoles can be determined, awaken by an external dipole. In addition, whenever N is small, the solution may be derived directly from Eqs. 36 and 37, providing the fastest method with the flaw of not having an analytical solution.

The derivation below includes momentum dependence in one or two dimensions for the Green's function, the lattice dipoles, and the electric field. To reduce notation confusion, the players are re-defined. First, the Green's function is a free space Green's function with one vector variable instead of two, and it will be written as D(r,r')→D(r−r'). The momentum dependent Green's function will be defined as $$D_{3D}(r,k)=\Sigma_j D(r+r_j)e^{-ik\cdot r_j}, \tag{38}$$

which is not a Fourier transform, but a shifted phased summation with an inverse transform of $$D(r) = \frac{V_{u,c}}{(2\pi)^3}\int_{B,Z} D_{3D}(r,k)dk.$$

Therefore, there is no Nyquist condition on k. When the lattice dimension will be below 3, the relevant Green's functions will be defined as $$D_{1D}(r,k_z)=\Sigma_j D(r+z_j\hat{z})e^{-ik_z z_j};D_{2D}(r,k_\rho)=\Sigma_j D(r+\rho_{j,x}\hat{x}+\rho_{j,y}\hat{y})e^{-ik_\rho\cdot\rho_j} \tag{39}$$

where $z_j$=ja and $\rho_j=(\rho_{j,x}, \rho_{j,y})$ are the one and two-dimensional lattice locations. The Bloch periodic property remains also for lower dimension transforms, for example in 1D $$D_{1D}(r+z_i\hat{z},k_z) = \sum_j D(r+z_i\hat{z}+z_j\hat{z})e^{-ik_z z_j} = \sum_j D(r+z_i\hat{z}+z_j\hat{z})e^{-ik_z z_j}e^{-ik_z z_i}e^{ik_z z_i} = \sum_l D(r+z_l\hat{z})e^{-ik_z z_l}e^{ik_z z_i} = D_{1D}(r,k_z)e^{ik_z z_i}. \tag{40}$$

The momentum dependent lattice dipoles, which correspond to a coherent movement of type atoms a is defined as $p_{a,1D}(k_z)=\Sigma_j e^{-ik_z z_j}p_{j,a}$, $p_{a,2D}(k_\rho)=\Sigma_j e^{-ik_\rho\cdot\rho_j}p_{j,a}$ and $p_{a,3D}(k)=\Sigma_j e^{-ik\cdot r_j}p_{j,a}$.

The momentum dependent electric field is defined using both the space and the momentum coordinates, $$E_{3D}(r,k)=\sum_j e^{-ik\cdot r_j}E(r+r_j);E(r)=\frac{V_{u,c}}{(2\pi)^3}\int_{B,Z}E_{3D}(r,k)dk \tag{41}$$

where r is again considered as an offset, and there is no condition on the momentum k. In the same manner, for lower dimensions $$E_{1D}(r,k_z)=\Sigma_i e^{-ik_z z_i}E(r+z_i\hat{z});E_{2D}(r,k_\rho)=\Sigma_i e^{-ik_\rho\cdot\rho_j}E(r+\rho_{j,x}\hat{x}+\rho_{j,y}\hat{y}). \tag{42}$$

The last quantity to define here is the momentum dependent Green's function that corresponds to the last term in Eq. (3b), that is the influence of atoms of the same kind but in different unit cells on the dipole of a specific atom a. It differs from the previous momentum dependent Green's function by omitting any self-interaction, $$D_{3D}^{\varnothing}(r,k)=\Sigma_{j\neq 0}D(r+r_j)e^{-ik\cdot r_j}, \tag{43}$$

In the same manner, for lower dimensions, $$D_{1D}^{\varnothing}(r,k_z)=\Sigma_{j\neq 0}D(r+z_j\hat{z})e^{-ik_z z_j};D_{2D}^{\varnothing}(r,k_\rho)=\Sigma_{j\neq 0}D(r+\rho_{j,x}\hat{x}+\rho_{j,y}\hat{y})e^{-ik_\rho\cdot\rho_j} \tag{44}$$

Zero-Dimension Lattice

In the case of a zero-dimension lattice, there is one unit cell, and there is no need to convert into k-space so that equations 36 and 37 reduce into:

$$E(r)=D(r-r')p(r')+\Sigma_b D(r-r_b)p_b \tag{45}$$

$$p_a\alpha_a^{-1}=D(r_a-r')p(r')+\Sigma_{b\neq a}D(u_a-u_b)p_b \tag{46}$$

This set of equation is of the size of the number of atoms in a unit cell, so that in case of one atom of type a the scattered Green's function is $$\overline{\overline{G}}_{0D}^{scat}(r,r')=D(r-r_a)\alpha_a D(r_a-r'). \tag{47}$$

One-Dimension Lattice

Considering a case where the lattice is infinite in one dimension so that $r_j=z_j\hat{z}=ja\hat{z}$, where a is the distance between neighboring unit cells. This fact allows us to separate the problem as a function of the radial coordinate ρ=(x, y, 0) and the z direction, where a transition into the one-dimensional k-space is required. Similar to the above, the following derivation is correct for EM waves with z component wave vector that satisfies $k_z<\pi/a$. In this case, the contribution of the lattice dipoles in Eq. (3a) becomes $$E(r)=D(r,r')p(r')+\Sigma_{j,b}D(r,r_{j,b})p_{j,b}$$

$$E_{1D}(r,k_z)=\Sigma_i e^{-ik_z z_i}E(r+z_i\hat{z})=\Sigma_i\Sigma_{j,b}e^{-ik_z z_i}D(r+z_i\hat{z}-z_j\hat{z}-u_b)p_{j,b}=\Sigma_{j,b}D_{1D}(r-z_j\hat{z}-u_b,k_z)p_{j,b}=\Sigma_{j,b}e^{-ik_z z_j}D_{1D}(r-u_b,k_z)p_{j,b};\ E_{1D}(r,k_z)=\Sigma_b D_{1D}(r-u_b,k_z)p_{b,1D}(k_z), \tag{48}$$

where the Bloch periodicity of $D_{1D}(r,k_z)$ is used. In order to get an expression for $p_{b,1D}(k_z)$, converting Eq. 37 into a set of linear equations of the number of unit cell atoms:

$$(\alpha_a^{-1}-D_{1D}^{\varnothing}(0,k_z))p_{a,1D}(k_z)=\Sigma_{b\neq a}D_{1D}(u_a-u_b,k_z)p_{b,1D}(k_z)+D_{1D}(u_a-r',k_z)p(r')$$

$$p_{a,1D}(k_z)=(\alpha_a^{-1}-D_{1D}^{\varnothing}(0,k_z))^{-1}\{D_{1D}(u_a-r',k_z)p(r')+\Sigma_{b\neq a}D_{1D}(u_a-u_b,k_z)p_{b,1D}(k_z)\} \tag{49}$$

In total, when there is one atom in a unit cell, are written $$E_{1D}(r,k_z)=D_{1D}(r-u_a,k_z)(\alpha_a^{-1}-D_{1D}^{\varnothing}(0,k_z))^{-1}D_{1D}(u_a-r',k_z)p(r') \tag{50}$$

So that the scattering Greens function is $$\overline{\overline{G}}_{1D}^{scat}(r,r')=\frac{a}{2\pi}\int_{B\cdot Z}D_{1D}(r-u_a,k_z)\left(\alpha_a^{-1}-D_{1D}^{\phi}(0,k_z)\right)^{-1}D_{1D}(u_a-r',k_z)dk_z, \tag{51}$$

where the only assumption is that the wavelength in the z direction is larger than twice the lattice period.

Two-Dimension Lattice

With the same logic as one-dimension lattice, the problem is divided into an in-plane coordinate ρ=(x, y) and an out-of-plane coordinate z. The solution may involve the multiplication of matrices with the same in-plane wave-vector $k_\rho=(k_x, k_y)$. The lattice contribution in equation (3a) converts into $$E_{2D}(r,k_\rho)=\Sigma_b D_{2D}(r-u_b,k_\rho)p_{b,2D}(k_\rho), \tag{52}$$

while equation (3b) converts into $$p_{a,2D}(k_\rho)=(\alpha_a^{-1}-D_{2D}^{\varnothing}(0,k_\rho))^{-1}[D_{2D}(u_a-r',k_\rho)p(r')+\Sigma_{b\neq a}D_{2D}(u_a-u_b,k_\rho)p_{b,2D}(k_\rho)]. \tag{53}$$

So that the scattering Green's function for one atom in the unit cell is $$\overline{\overline{G}}_{2D}^{scat}(r,r')=\frac{A_{u\cdot c}}{(2\pi)^2}\int_{B\cdot Z}\sum_b D_{2D}(r-u_b,k_\rho)\left(\alpha_a^{-1}-D_{2D}^{\phi}(0,k_\rho)\right)^{-1}D_{2D}(u_a-r',k_\rho)dk_\rho,$$

where $A_{u.c}$ is the unit cell area.

The next step is to simplify the Green's function expression by determining favorable conditions that may not require to calculate the integral. There are two ways to do that, generally by converting the left-most D or the right-most D to a kind-of delta function. The meaning of converting the right-most D is that the source (r') is very far away. This will mean that the system is excited with a plane wave, which is interesting for this use as well as for different purposes. The meaning of converting the left-most D is that the observer (r) is very far away, i.e. looking at the far field emitted from the system.

Simplifying the Free-Space Greens Function

The expression for the greens function as a function of $k_z$ is:

$$D_{1D}(r,k_z)=-\sum_j\mu_0\omega^2\frac{e^{ik_0\Omega_j}}{4\pi\Omega^3k_0^2}\left\{\left[1-ik_0\Omega_j-(k_0\Omega_j)^2\right]I-\left[3-3ik_0\Omega_j-(k_0\Omega_j)^2\right]e_{\Omega_j}e_{\Omega_j}\right\}e^{-ik_z z_j}, \tag{54}$$

where $\Omega_j=|r+z_j\hat{z}|$.

Far Field Expression

One useful case is when $r>>z_j$ for every j. In this case, $$\Omega_j=|r-z_j\hat{z}|=\sqrt{x^2+y^2+(z+z_j)^2}\cong\sqrt{r^2-2z_jz}\cong r+z_j\frac{z}{r}$$

so that $$D_{1D}(r,k_z)\cong-\sum_j\mu_0\omega^2\frac{e^{ik_0\left(r+z_j\frac{z}{r}\right)}e^{-ik_z z_j}}{4\pi r^3k_0^2}\left\{\left[1-ik_0r-(k_0r)^2\right]I-\right. \tag{55}$$

-continued $$\left[3-3ik_0r-(k_0r)^2\right]\hat{r}\hat{r}\} \cong \mu_0\omega^2\frac{e^{ik_0r}}{4\pi r}\{I-\hat{r}\hat{r}\}\sum_j e^{-i\left(k_z-k_0\frac{z}{r}\right)ja},$$

assuming $k_0r>>1$.

In total, requiring delta function for the Bragg diffraction orders in k-space for the Greens function:

$$D_{1D}(r,k_z) \cong \mu_0\omega^2\frac{e^{ik_0r}}{4\pi r}(I-\hat{r}\hat{r})\left\{\frac{2\pi}{a}\sum_n\delta\left(k_z-k_0\frac{z}{r}-\frac{2\pi n}{a}\right)\right\}. \tag{56}$$

The electric field can be expressed as the contribution of the dipoles that move in a spatial frequency of $$k_z=k_0\frac{z}{r},$$

that is momentum matched in the z direction to the free space photon, $$E(r)=\mu_0\omega^2\frac{e^{ik_0r}}{4\pi r}(I-\hat{r}\hat{r})\sum_b p_{b,1D}\left(k_0\frac{z}{r}\right). \tag{57}$$

The scattering Greens function in case of one atom in the unit cell can be expressed as $$\bar{\bar{G}}^{scat}_{1D}(r,r')=\mu_0\omega^2\frac{e^{ik_0r}}{4\pi r}(I-\hat{r}\hat{r})\times \sum_n\left(\alpha_a^{-1}-D^{\phi}_{1D}\left(0,k_0\frac{z}{r}+\frac{2\pi n}{a}\right)\right)^{-1}D_{1D}\left(u_a-r',k_0\frac{z}{r}+\frac{2\pi n}{a}\right). \tag{58}$$

$D_{1D}^{\varnothing}(0, k_z)$ Expression

In this case $\Omega_j=z_j\hat{z}$, and $$D^{\phi}_{1D}(0,k_z)=-\sum_{j\neq 0}\mu_0\omega^2\frac{e^{ik_0|z_j|}}{4\pi|z_j|^3k_0^2}\left\{\left[1-ik_0|z_j|-(k_0|z_j|)^2\right]I-\left[3-3ik_0|z_j|-(k_0|z_j|)^2\right]\hat{z}\hat{z}\right\}e^{-ik_zz_j} \tag{59}$$

$$D^{\phi}_{1D}(0,k_z)=-\frac{\mu_0\omega^2}{4\pi k_0^2a^3}\sum_{j=1}^{\infty}\left(e^{-i(k_z-k_0)aj}+e^{-i(-(k_0+k_z)a)j}\right)\left\{\left[\frac{1}{j^3}-\frac{ik_0a}{j^2}-\frac{(k_0a)^2}{j}\right](\hat{x}\hat{x}+\hat{y}\hat{y})-\left[\frac{2}{j^3}-\frac{2ik_0a}{j^2}\right]\hat{z}\hat{z}\right\} \tag{60}$$

With the formulas:

$$\sum_{n=1}^{\infty}\frac{e^{-i\omega n}}{n}=i\frac{\pi}{2}\mathrm{sgn}(\omega),\ \sum_{n=1}^{\infty}\frac{e^{-i\omega n}}{n^2}=-\frac{\pi}{2}\omega\,\mathrm{sgn}(\omega)\text{ and }\sum_{n=1}^{\infty}\frac{e^{-i\omega n}}{n^3}=-i\frac{\pi}{2}\frac{\omega^2}{2}\mathrm{sgn}(\omega),$$

and $$\sum_{n=1}^{\infty}\frac{e^{-i\omega n}}{n^3}=-i\frac{\pi}{2}\frac{\omega^2}{2}\mathrm{sgn}(\omega),$$

where sgn(x) is the sign of x, $$D^{\phi}_{1D}(0,k_z)=-\frac{\mu_0\omega^2}{4\pi k_0^2a^3}\frac{\pi}{2}(\mathrm{sgn}(k_z-k_0)-\mathrm{sgn}(k_0+k_z))\left\{\left[-\frac{ia^2}{2}\left[(k_z-k_0)^2+(k_0+k_z)^2\right]+ik_0a((k_z-k_0)a-(k_0+k_z)a)-i(k_0a)^2\right](\hat{x}\hat{x}+\hat{y}\hat{y})-\left[-2\frac{ia^2}{2}\left[(k_z-k_0)^2+(k_0+k_z)^2\right]+2ik_0a((k_z-k_0)a-(k_0+k_z)a)\right]\hat{z}\hat{z}\right\} \tag{61}$$

$$D_{1D}(0,k_z)=-\frac{\mu_0\omega^2}{4\pi k_0^2a^3}\frac{\pi}{2}(\mathrm{sgn}(k_z-k_0)-\mathrm{sgn}(k_0+k_z))\left\{\left[-ia^2\left[k_z^2+k_0^2\right]-i(k_0a)^2-i(k_0a)^2\right](\hat{x}\hat{x}+\hat{y}\hat{y})-\left[-2ia^2\left[k_z^2+k_0^2\right]-2i(k_0a)^2\right]\hat{z}\hat{z}\right\}$$

$$D^{\phi}_{1D}(0,k_z)=\frac{-i\mu_0\omega^2}{2\pi a}\frac{\pi}{2}\left\{\left[(k_z/k_0)^2+3\right](\hat{x}\hat{x}+\hat{y}\hat{y})-\left[2(k_z/k_0)^2+4\right]\hat{z}\hat{z}\right\}\Theta(k_0-|k_z|)$$

where $\Theta(x)$ is the step function. The resulting $D_{1D}^{\varnothing}(0, k_z)$ acts as a low pass filter, that will not transform a signal whenever $|k_z|>k_0$. Additionally, it is a diagonalized matrix that its inverse matrix is easily calculated.

Thus, the present technique utilizes MCS having selected layers' arrangement for providing efficient and tunable radiation source (e.g. X-ray radiation). The techniques utilize periodic arrangement of layers formed of two or more material compositions to provide coherent emission of electromagnetic radiation in response to electron beam of selected energy impinging thereon. The use of coherent emission allows directionality and spectral tuning of the emitted radiation based on the MCS design.

The invention claimed is:

1. An energy converter unit comprising a multilayered crystal structure having a selected layers' arrangement comprising at least first and second types of layers of at least first and second material compositions; said layers' arrangement is formed of a pattern of $n_1$ layers of said first layer type and $n_2$ layers of said second layer type generating a selected lattice periodicity of said layers; said selected lattice periodicity changes between the layers, in the form of variation of said number of layers $n_1$ and $n_2$ of the first and second material compositions, such that said multilayered crystal structure responds to interaction with a charged particle beam of predetermined parameters by coherent emission of X-ray radiation having selected spectral content and emission direction.

2. The energy converter unit of claim 1, wherein the selected layers' arrangement and selected lattice periodicity of said layers of said multilayered crystal structure are selected in accordance with a desired angular distribution of spectral content of said coherent X-ray emission.

3. The energy converter unit of claim 1, wherein said multilayered crystal structure is formed of a multilayered van der Waals material.

4. The energy converter unit of claim 1, wherein said selected lattice periodicity is defined by selected numbers of layer n1 and n2 and interlayer first and second distances of layers of the first and second material compositions respectively, to provide the coherent X-ray emission having spectral components and angular distribution according to $$\hbar\omega_m=\frac{hc\beta\cos(\theta)}{(n_1d_1+n_2d_2)(1-\beta\cos(\varphi))}\cdot m,$$

wherein $\omega_m$ is the X-ray emission frequency, m being an integer (0, 1, 2, 3 . . . ); θ is the angular relation between wavevector of the electron beam and reciprocal lattice vector; φ is the angular relation between wavevector of the electron beam and the emitted X-ray direction; and d1 and d2 are the interlayer first and second distances of layers of the first and second material compositions respectively.

5. The energy converter unit of claim 4, wherein said multilayered crystal structure provides dominant X-ray emission order m given by $m=n_1+n_2$.

6. The energy converter unit of claim 1, wherein said selected lattice periodicity of the multilayered crystal structure is configured to define atomic crystal lattices which undulate the charged particles such that said X-ray radiation is energy tunable, enabling selection of spectral-angular distribution of the X-ray radiation being emitted.

7. The energy converter unit of claim 6, wherein said tunable radiation is in a wavelength range between 4.4 nm and 2.33 nm.

8. The energy converter unit of claim 1, wherein said multilayered crystal structure is configured as a superlattice structure.

9. The energy converter unit of claim 8, wherein said superlattice structure is configured to satisfy a matching condition between dominant diffraction lines of the charged particles and dominant diffraction lines of the X-ray radiation to be emitted.

10. The energy converter unit of claim 1, wherein said multilayered crystal structure is configured to cause diffraction of the charged particles propagating therethrough resulting from coherent interaction with intrinsic atomic periodicity of the multilayered crystal structure.

11. The energy converter unit of claim 1, wherein said multilayered crystal structure is configured to undergo resonant interaction with the charged particles impinging thereon thereby inducing parametric coherent bremsstrahlung to thereby cause the X-ray radiation emission.

12. The energy converter unit of claim 1, wherein said multilayered crystal structure is formed by layers' arrangement comprising first and second layers having first and second material compositions selected from: graphene, hexagonal Boron nitride (hBN), $WSe_2$, $CrPS_4$, $FePS_3$, $MnPS_3$, $NiPS_3$, $CoPS_3$, $MoS_2$, InAr, GaSb, Mo, Si, $WSe_2$, and tungsten (W).

13. The energy converter unit of claim 1, wherein said multilayered crystal structure is formed by layers' arrangement comprising first and second layers having first and second material compositions selected from the following: GaAs, InP, Si, NaCl, GaP, SiC, W, ZnO, $MgAl_2O_4$, $TiO_2$, MgO.

14. The energy converter unit of claim 1, wherein said multilayered crystal structure is formed with gradual variation of the number of layers $n_1$ or $n_2$ providing curved wavefront of X-ray emission from said energy converter unit.

15. The energy converter unit of claim 1, wherein said multilayer crystal structure is bent about a selected axis, providing effective variation in distance between layers with respect to charges particles beam passing through the multilayer crystal structure.

16. An X-ray source unit comprising:

an energy converter unit adapted for emitting X-ray radiation in response charged particles beam directed thereto; said energy converter unit comprises a selected set of multilayered crystal structures, each multilayered crystal structure having a selected layers' arrangement comprising at least first and second layers of at least first and second material compositions, said selected layers' arrangement being formed of a pattern of $n_1$ layers of said first layer type and $n_2$ layers of said second layer type generating a selected lattice periodicity of said layers, said lattice periodicity being selected such that said multilayered crystal structure responds to interaction with the charged particle beam of predetermined parameters by coherent emission of X-ray radiation having selected spectral content and emission direction; wherein said multilayered crystal structures have selected different layers' arrangements differing by at least said pattern of $n_1$ layers of said first layer type and $n_2$ layers of said second layer type, thereby enabling to selectively vary spectral content of X-ray emission; and an energy converter mount configured for mounting said multilayered crystal structures.

17. The X-ray source system of claim 16, wherein the selected layers' arrangement and selected lattice periodicity of said layers of said multilayered crystal structure are selected in accordance with a desired angular distribution of spectral content of said coherent X-ray emission.

18. The X-ray source system of claim 16, further comprising a charged particle emitting unit configured for emitting the charged particle beam having selected energy impinging onto said multilayered crystal structure with a selected angle of incidence.

19. The X-ray source system of claim 16, wherein said multilayered crystal structure is formed of a multilayered Van der Waals material.

20. The X-ray source system of claim 16, wherein said selected lattice periodicity is defined by selected numbers of layer $n_1$ and $n_2$ and interlayer first and second distances of layers of the first and second material compositions respectively, to provide the coherent X-ray emission having spectral components and angular distribution according to $$\hbar\omega_m = \frac{hc\beta\cos(\theta)}{(n_1 d_1 + n_2 d_2)(1-\beta\cos(\varphi))}\cdot m,$$

wherein $\omega_m$ is the X-ray emission frequency, m being an integer (0, 1, 2, 3 . . . ); θ is the angular relation between wavevector of the electron beam and reciprocal lattice vector; φ is the angular relation between wavevector of the electron beam and the emitted X-ray direction; and d1 and d2 are the interlayer first and second distances of layers of the first and second material compositions respectively.

21. The X-ray source system of claim 20, wherein said multilayered crystal structure provides dominant X-ray emission order m given by $m=n_1+n_2$.

22. The X-ray source system of claim 16, wherein said multilayered crystal structure is formed by layers' arrangement comprising first and second layers having first and second material compositions selected from: graphene, hexagonal Boron nitride (hBN), $WSe_2$, $CrPS_4$, $FePS_3$, $MnPS_3$, $NiPS_3$, $CoPS_3$, $MoS_2$, InAr, GaSb, Mo, Si, $WSe_2$, and tungsten (W).

23. The X-ray source system of claim 16, wherein said multilayered crystal structure is formed by layers' arrangement comprising first and second layers having first and second material compositions selected from the following: GaAs, InP, Si, NaCl, GaP, SiC, W, ZnO, $MgAl_2O_4$, $TiO_2$, MgO.

24. The X-ray source system of claim 16, wherein said multilayered crystal structure is formed with gradual variation of the number of layers $n_1$ or $n_2$ providing curved wavefront of X-ray emission from said energy converter unit.

25. The X-ray source system of claim 16, wherein said multilayer crystal structure is bent about a selected axis, providing effective variation in distance between layers with respect to charges particles beam passing through the multilayer crystal structure.

26. A method for use in designing energy conversion unit, the method comprising: providing data on selected spectral components of emitted radiation, selected exciting electron beam energy, and selected angular relation between electron beam and emission directions; using the data on spectral components of emitted radiation, electron beam energy and angular relations and determining layered arrangement formed of an arrangement of two or more material compositions; producing one or more multilayered crystal structure of the two or more material compositions, wherein said arrangement of two or more layers is formed with gradually varying number of layers of each material composition, variation of the number of layers is selected to provide curved wavefront of X-ray emission.

27. The method of claim 26, wherein said producing said one or more multilayered crystal structure comprises using layer deposition of said two or more material compositions is in said arrangement of two or more layers.

28. The method of claim 26, wherein said arrangement of two or more layers is formed by an arrangement of $n_1$ layers of a first material composition followed by $n_2$ layers of a second material composition.

29. The method of claim 26, wherein said arrangement of two or more layers is formed by layer-by-layer growth, where each layer is formed of a selected material composition.

30. An energy converter unit comprising a multilayered crystal structure having a selected layers' arrangement comprising at least first and second types of layers of at least first and second material compositions; said layers' arrangement is formed of a pattern of $n_1$ layers of said first layer type and $n_2$ layers of said second layer type generating a selected lattice periodicity of said layers; said selected lattice periodicity is selected such that said multilayered crystal structure responds to interaction with a charged particle beam of predetermined parameters by coherent emission of X-ray radiation having selected spectral content and emission direction, wherein said selected lattice periodicity is defined by selected numbers of layer n1 and n2 and interlayer first and second distances of layers of the first and second material compositions respectively, to provide the coherent X-ray emission having spectral components and angular distribution according to $$\hbar\omega_m = \frac{hc\beta\cos(B)}{(n_1d_1 + n_2d_2)(1-\beta\cos(\varphi))}\cdot m$$

wherein $\omega_m$ is the X-ray emission frequency, m being an integer (0, 1, 2, 3 . . . ); θ is the angular relation between wavevector of the electron beam and reciprocal lattice vector; φ is the angular relation between wavevector of the electron beam and the emitted X-ray direction; and d1 and d2 are the interlayer first and second distances of layers of the first and second material compositions respectively.

31. The energy converter unit of claim 30, wherein said lattice periodicity changes between layers, in the form of variation of said number of layers $n_1$ and $n_2$ of the first and second material compositions.

32. An X-ray source unit comprising an energy converter unit adapted for emitting X-ray radiation in response charged particles beam directed thereto; said energy converter unit comprises one or more multilayered crystal structures having a selected layers' arrangement comprising at least first and second of layers of at least first and second material compositions, said selected layers' arrangement being formed of a pattern of $n_1$ layers of said first layer type and $n_2$ layers of said second layer type generating a selected lattice periodicity of said layers, said selected lattice periodicity being selected such that said multilayered crystal structure responds to interaction with the charged particle beam of predetermined parameters by coherent emission of X-ray radiation having selected spectral content and emission direction, wherein said selected lattice periodicity is defined by selected numbers of layer $n_1$ and $n_2$ and interlayer first and second distances of layers of the first and second material compositions respectively, to provide the coherent X-ray emission having spectral components and angular distribution according to $$\hbar\omega_m = \frac{hc\beta\cos(B)}{(n_1d_1 + n_2d_2)(1-\beta\cos(\varphi))}\cdot m,$$

wherein $\omega_m$ is the X-ray emission frequency, m being an integer (0, 1, 2, 3 . . . ); θ is the angular relation between wavevector of the electron beam and reciprocal lattice vector; φ is the angular relation between wavevector of the electron beam and the emitted X-ray direction; and d1 and d2 are the interlayer first and second distances of layers of the first and second material compositions respectively.

33. The X-ray source system of claim 32, wherein said X-ray source system comprises an energy converter mount configured for mounting said multilayered crystal structure, and wherein said X-ray source system comprises a selected set of multilayered crystal structures having selected different layers' arrangement differing by at least said pattern of $n_1$ layers of said first layer type and $n_2$ layers of said second layer type, thereby enabling to selectively vary spectral content of X-ray emission.

34. The X-ray source system of claim 33, further comprising a crystal switching mechanism configured and operable to selective position a selected multilayered crystal structure in path of an electron beam for generating selected spectral content of X-ray emission.

* * * * *